United States Patent
Steinhardt et al.

(10) Patent No.: US 11,032,153 B2
(45) Date of Patent: Jun. 8, 2021

(54) METHOD, MEDIUM, AND SERVER SYSTEM FOR ALLOCATING AND TRACKING RESOURCE DISTRIBUTIONS IN COMPUTER NETWORKS

(71) Applicant: CLASSWALLET, Miami, FL (US)

(72) Inventors: Neil Steinhardt, Parkland, FL (US); James Rosenberg, Miami, FL (US); Ronald Butler, Ft. Lauderdale, FL (US)

(73) Assignee: CLASSWALLET, Miami, FL (US)

( * ) Notice: Subject to any disclaimer, the term of this patent is extended or adjusted under 35 U.S.C. 154(b) by 115 days.

(21) Appl. No.: 16/182,514

(22) Filed: Nov. 6, 2018

(65) Prior Publication Data
US 2019/0073733 A1 Mar. 7, 2019

Related U.S. Application Data

(63) Continuation-in-part of application No. 15/243,804, filed on Aug. 22, 2016, now Pat. No. 10,122,648.
(Continued)

(51) Int. Cl.
*G06Q 30/00* (2012.01)
*H04L 12/24* (2006.01)
(Continued)

(52) U.S. Cl.
CPC ......... *H04L 41/22* (2013.01); *G06Q 30/0641* (2013.01); *G06Q 50/205* (2013.01)

(58) Field of Classification Search
None
See application file for complete search history.

(56) References Cited

U.S. PATENT DOCUMENTS

2010/0114606 A1\* 5/2010 Snyder .................. G06Q 10/06
705/3
2010/0299738 A1 11/2010 Wahl
(Continued)

OTHER PUBLICATIONS

Friese, T., A Robust Business Resource Management Framework Based on a Peer-to-Peer Infrastructure, Jan. 1, 2005, Seventh IEEE International Conference on E-Commerce Technology, pp. 215-222 (Year: 2005).\*
(Continued)

*Primary Examiner* — Jeffrey A. Smith
*Assistant Examiner* — Timothy J Kang
(74) *Attorney, Agent, or Firm* — Morgan, Lewis & Bockius LLP

(57) ABSTRACT

Systems and methods for managing resource distributions are disclosed herein. An example method includes: receiving, at a first server and from a first resource provider (e.g., an educational foundation), a first provision of resources for a resource recipient (e.g., a teacher) and at least one restriction that restricts the resource recipient's use of the first provision of resources. The method also includes segmenting the first provision of resources, within a repository of resources associated with the resource recipient, such that the first provision of resources is uniquely identified as associated with the first resource provider. The method further includes: receiving, from a second server distinct from the first server, information about available items; receiving, from the resource recipient, a request to use at least a portion of the first provision of resources to obtain one or more of the available items; and, in accordance with a determination that the request complies with the at least one restriction associated with the first provision of resources, processing the request and generating a report for the resource provider.

20 Claims, 18 Drawing Sheets

Related U.S. Application Data

(60) Provisional application No. 62/208,510, filed on Aug. 21, 2015.

(51) Int. Cl.
*G06Q 30/06* (2012.01)
*G06Q 50/20* (2012.01)

(56) References Cited

U.S. PATENT DOCUMENTS

| | | | |
|---|---|---|---|
| 2012/0116958 A1* | 5/2012 | Soholt | G06Q 20/10 705/39 |
| 2013/0054455 A1* | 2/2013 | Hanson | G06Q 40/02 705/42 |
| 2013/0268377 A1* | 10/2013 | Jessup | G06Q 30/0605 705/14.73 |
| 2017/0054650 A1 | 2/2017 | Steinhardt | |
| 2017/0054726 A1 | 2/2017 | Friedmann | |
| 2017/0116179 A1* | 4/2017 | Gagne-Langevin | G06F 40/226 |
| 2017/0359356 A1 | 12/2017 | Brandwine | |

OTHER PUBLICATIONS

Steinhardt, Notice of Allowance, U.S. Appl. No. 15/243,804, dated Jul. 3, 2018, 7 pgs.

\* cited by examiner

| Report ID | Provider | Recipient | Resource Provision ID and Name | Status | Report Contents |
|---|---|---|---|---|---|
| 1 | Ed Fund 1 | Teacher A | 2: Fall Supplies | Viewed | {...} |
| 2 | Parent Z | Teacher A | 3: Trip to Museum | Emailed | {...} |
| 3 | Ed Fund 2 | Teacher A | 5: Spring Supplies | Available | {...} |
| 4 | Civic Org Z | User X | 12: Civic Org Event | Emailed | {...} |
| ... | ... | ... | ... | ... | ... |

Reports Database 110-1
Header 410-0
Record 410-1
Record 410-2
Record 410-3
Record 410-4
Record 410-N

| Event ID | Resource ID | Resource Provision Name | Event Type | Amount | Event Details |
|---|---|---|---|---|---|
| 1 | 2 | Fall Supplies | Provision | 100.00 | {...} |
| 2 | 3 | Trip to Museum | Expenditure | -61.38 | {...} |
| 3 | 5 | Spring Supplies | Expiration | -50.00 | {...} |
| ... | ... | ... | ... | ... | ... |

Header 510-0
Record 510-1
Record 510-2
Record 510-N
Record 510-N

Resource Management Database 112-1

METHOD, MEDIUM, AND SERVER SYSTEM FOR ALLOCATING AND TRACKING RESOURCE DISTRIBUTIONS IN COMPUTER NETWORKS

RELATED APPLICATION

This application is a continuation-in-part of U.S. patent application Ser. No. 15/243,804, filed Aug. 22, 2016, which claims priority to U.S. Provisional Application Ser. No. 62/208,510, filed Aug. 21, 2015, and each of these applications is hereby incorporated by reference in its respective entirety.

TECHNICAL FIELD

The disclosed embodiments relate generally to computer networks and, in particular, to allocating and tracking resource distributions in computer networks by generating user-specific reports based on access rights assigned to various resource providers associated with a single resource recipient.

BACKGROUND

Resource management systems allow recipients (e.g., teachers, librarians, users associated with civic groups, users associated with non-profit organizations, etc.) to receive resources (e.g., physical items like school supplies, books, athletic equipment, or digital resources like digital wallet funds, etc.) from parents, educational foundations, and other entities (i.e., "resource providers") that help these recipients obtain much-needed items and/or resources to help obtain the much-needed items. Some resource management systems allow providers to send resources directly to individual recipients. These systems, however, typically combine resources provided by many separate providers into a single, unorganized pool of resources, and, thus, these systems are not designed to update providers when the resources they provided are used by recipients. These systems are also unable to provide customized reports based on access rights associated with each individual provider with respect to a single recipient and, therefore providers are forced to use inefficient and time-consuming techniques to track resource distributions across distributed computer networks.

SUMMARY

Without limiting the scope of the appended claims, after considering this disclosure, and particularly after considering the section entitled "Description of Embodiments" one will understand how the aspects of various embodiments are implemented and used to address the above deficiencies and other problems associated with resource management systems.

Although some examples provided below are described with reference to teachers in educational environments receiving resources from parents, educational foundations, etc., the disclosed embodiments provided herein are capable of providing sophisticated allocation and tracking of resource distributions for a wide range of resource recipients, resource providers, and fundraising environments. For example, some embodiments provide for sophisticated allocation and tracking of resource distributions for users (i.e., resource recipients) associated with civic or non-profit organizations (such as Reading is Fundamental, Boys and Girls Clubs, Junior Leagues, Libraries, etc.) receiving resource distributions from their associated organizations.

(A1) More specifically, some embodiments include a method of generating reports that are specifically tailored based on access rights of a resource provider that is associated with a resource recipient. In some embodiments, the method is performed at a server (e.g., one or more of the resource management servers 106, FIG. 1) with one or more processors and memory. The method includes: assigning, to at least two resource providers (e.g., two or more of: a parent of a child attending school, an educational foundation, a civic organization associated with the school, etc.) that are each associated with a resource recipient (e.g., a teacher at the school, a user associated with the civic organization), access rights to receive information about resource allocation events associated with the resource recipient. The method further includes: detecting occurrence of a resource allocation event that is associated with the resource recipient and, in response to detecting the occurrence of the resource allocation event, storing information about the resource allocation event in a database. The method additionally includes: generating a plurality of reports using the stored information in the database, the plurality of reports including at least two unique reports, one report for each of the at least two resource providers based on respective assigned access rights associated with each of the at least two resource providers. In this way, providers are immediately notified about resource allocation events and need not use manual, time-consuming, and energy-wasting techniques to track resource distributions. Immediately notifying providers about resource allocation events helps to ensure that users do not waste time (and server-side resources and limited battery power on the client-side) searching aimlessly for information regarding distributed resources.

(A2) In some embodiments of the method of A1, generating the plurality of reports includes in accordance with a determination that first assigned access rights for a first resource provider of the at least two resource providers permit the first resource provider to receive information about the resource allocation event, generating a first unique report that is specifically tailored to the first resource provider based on the first assigned access rights for the first resource provider.

(A3) In some embodiments of the method of A2, generating the plurality of reports includes in accordance with a determination that second assigned access rights for a second resource provider of the at least two resource providers permit the second resource provider to receive information about the resource allocation event, generating a second unique report that is specifically tailored to the second resource provider based on the second assigned access rights for the second resource provider, wherein the second unique report includes less information about the first resource allocation event than the first unique report.

(A4) In some embodiments of the method of any one of A1-A3, the resource allocation event corresponds to the resource recipient using (i) at least a portion of a first resource, provided by a first resource provider of the at least two resource providers, and (ii) at least a portion of a second resource, provided by a second resource provider of the at least two resource providers, to obtain educational supplies.

(A5) In some embodiments of the method of any one of A1-A4, the resource recipient is a teacher.

(A6) In some embodiments of the method of A5, the at least two users include a school at which the teacher works.

(A7) In some embodiments of the method of A6, the at least two users include a school district that includes the school at which the teacher works.

In some other embodiments of the method of any one of A1-A4, the resource recipient is a user associated with a civic organization or a non-profit group (such as Reading is Fundamental, Boys and Girls Clubs, Junior Leagues, Libraries, etc.). Consistent with these other embodiments, the at least two users include a civic organization and a parent organization that is associated/affiliated with the civic organization.

(A8) In some embodiments of the method of A6, the at least two users include a parent of a student that is in one of the teacher's classes.

(A9) In some embodiments of the method of A6, the at least two users include an educational foundation that is associated with the teacher.

(A10) In another aspect, an electronic device with a display, memory, and one or more processors is provided. The memory stores one or more programs which, when executed by the one or more processors, cause the electronic device to perform the method of any one of A1-A9.

(A11) In one more aspect, a graphical user interface on an electronic device with a display is provided. The graphical user interface includes user interfaces displayed, on the display of the electronic device, in accordance with the method described in any one of A1-A9.

(A12) In yet one more aspect, a non-transitory computer-readable storage medium is provided. The non-transitory computer-readable storage medium stores executable instructions that, when executed by an electronic device with a display, cause the electronic device to perform the method of any one of A1-A9.

(A13) In one more aspect, a server that includes memory and one or more processors is provided. The memory stores one or more programs which, when executed by the one or more processors, cause the server to perform the method of any one of A1-A9.

Additional disclosed embodiments allocate and track the distribution of resources in a classroom resource management system.

(B1) More specifically, some embodiments include a method of allocating and tracking resource distributions in a classroom resource management system. In some embodiments, the method is performed at a first server (e.g., one or more of the resource management servers 106, FIG. 1) with one or more processors and memory. The method includes: receiving, from a first resource provider, a first provision of resources for a resource recipient and at least one restriction that restricts the resource recipient's use of the first provision of resources. The method also includes: segmenting the first provision of resources, within a repository of resources associated with the resource recipient, such that the first provision of resources is uniquely identified as associated with the first resource provider. The method additionally includes: (i) receiving, from a second server distinct from the first server, information about available items and (ii) receiving, from the resource recipient, a request to use at least a portion of the first provision of resources to obtain one or more of the available items. In accordance with a determination that the request complies with the at least one restriction associated with the first provision of resources, the method includes: processing the request and generating a report for the resource provider (e.g., a report that includes information about the items obtained by the resource recipient, in accordance with access rights that are assigned to the resource provider that allow the resource provider to view events associated with the resource recipient). In this way, providers are able to ensure that recipients use resources in accordance with the provider's restrictions, thus helping to avoid abuse, fraud, and other potential problems.

(B2) In some embodiments of the method of B1, the at least one restriction is an expiration date, a vendor-specific restriction, or a SKU-specific restriction.

(B3) In some embodiments of the method of any one of B1-B2, the resource recipient is a teacher and the first resource provider is an educational foundation associated with the teacher.

(B4) In some embodiments of the method of any one of B1-B2, the resource recipient is a teacher and the first resource provider is a parent of a student that is in one of the teacher's classes.

(B5) In some embodiments of the method of any one of B1-B4, generating the report for the resource provider includes generating a report for a school that is associated with the resource recipient.

(B6) In some embodiments of the method of any one of B5, generating the report for the resource provider includes generating a report for a school district that includes the school that is associated with the resource recipient.

In some other embodiments of the method of any one of B1-B2, the resource recipient is a user associated with a civic organization or a non-profit group (such as Reading is Fundamental, Boys and Girls Clubs, Junior Leagues, Libraries, etc.). Consistent with these other embodiments, the at least two users include a civic organization and a parent organization that is associated/affiliated with the civic organization.

(B7) In some embodiments of the method of any one of B1-B6, the first server is a resource management server provided by a first entity and further wherein the second server is an educational supplies server provided by a second entity distinct from the first entity.

(B8) In another aspect, an electronic device with a display, memory, and one or more processors is provided. The memory stores one or more programs which, when executed by the one or more processors, cause the electronic device to perform the method of any one of B1-B7.

(B9) In one more aspect, a graphical user interface on an electronic device with a display is provided. The graphical user interface includes user interfaces displayed, on the display of the electronic device, in accordance with the method described in any one of B1-B7.

(B10) In yet one more aspect, a non-transitory computer-readable storage medium is provided. The non-transitory computer-readable storage medium stores executable instructions that, when executed by an electronic device with a display, cause the electronic device to perform the method of any one of B1-B7.

(B11) In one more aspect, a server that includes memory and one or more processors is provided. The memory stores one or more programs which, when executed by the one or more processors, cause the server to perform the method of any one of B1-B7.

Thus methods, systems, electronic devices, and graphical user interfaces are provided that enable users to easily and intuitively allocate and track the distribution of resources in a classroom resource management system.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 8A-8I are schematics of a display used to illustrate exemplary user interfaces for a method of distributing and allocating resources in a resource management system, in accordance with some embodiments.

Figure 7A:
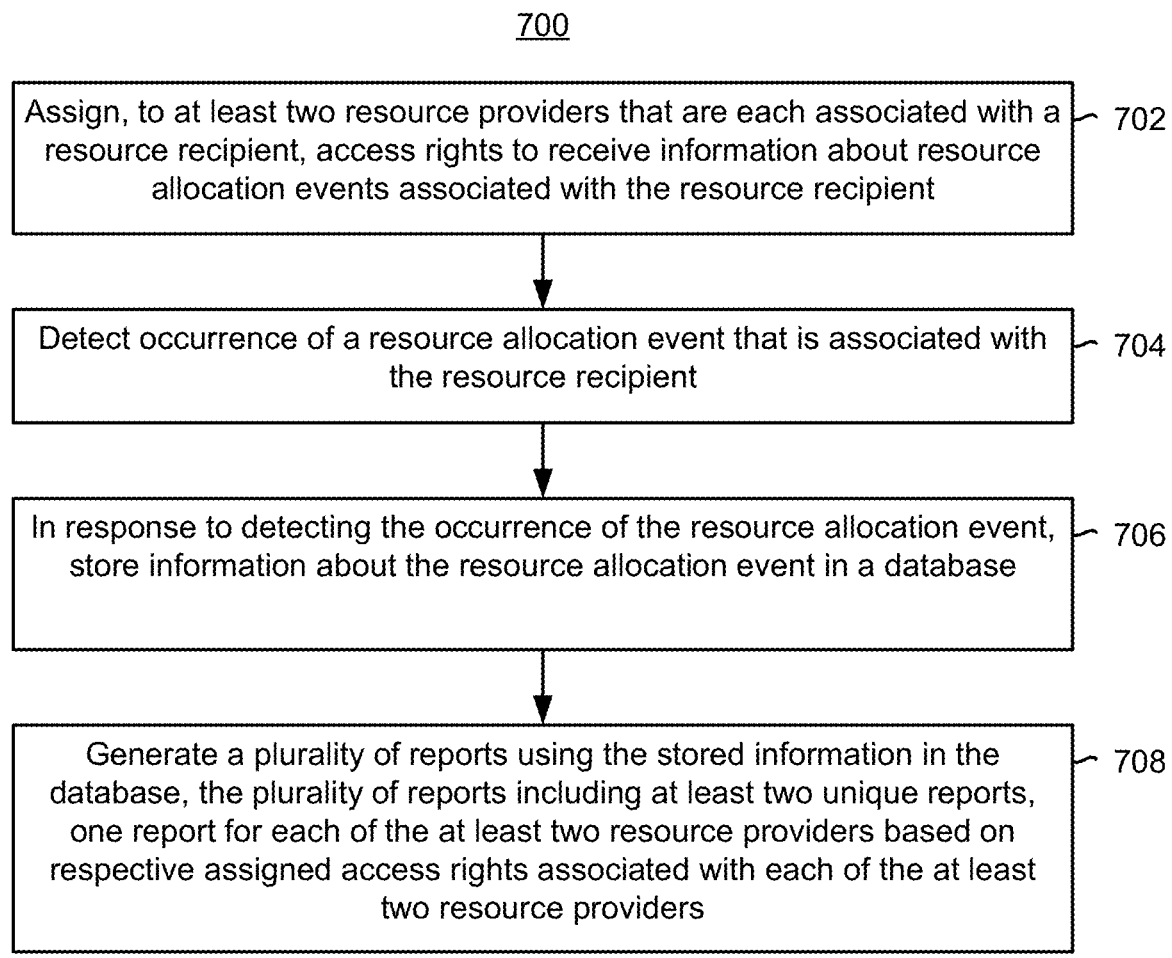
FIG. 7A is a flowchart representation of a method of providing tailored reports based on access rights in a resource management system, in accordance with some embodiments.
Figure 7B:
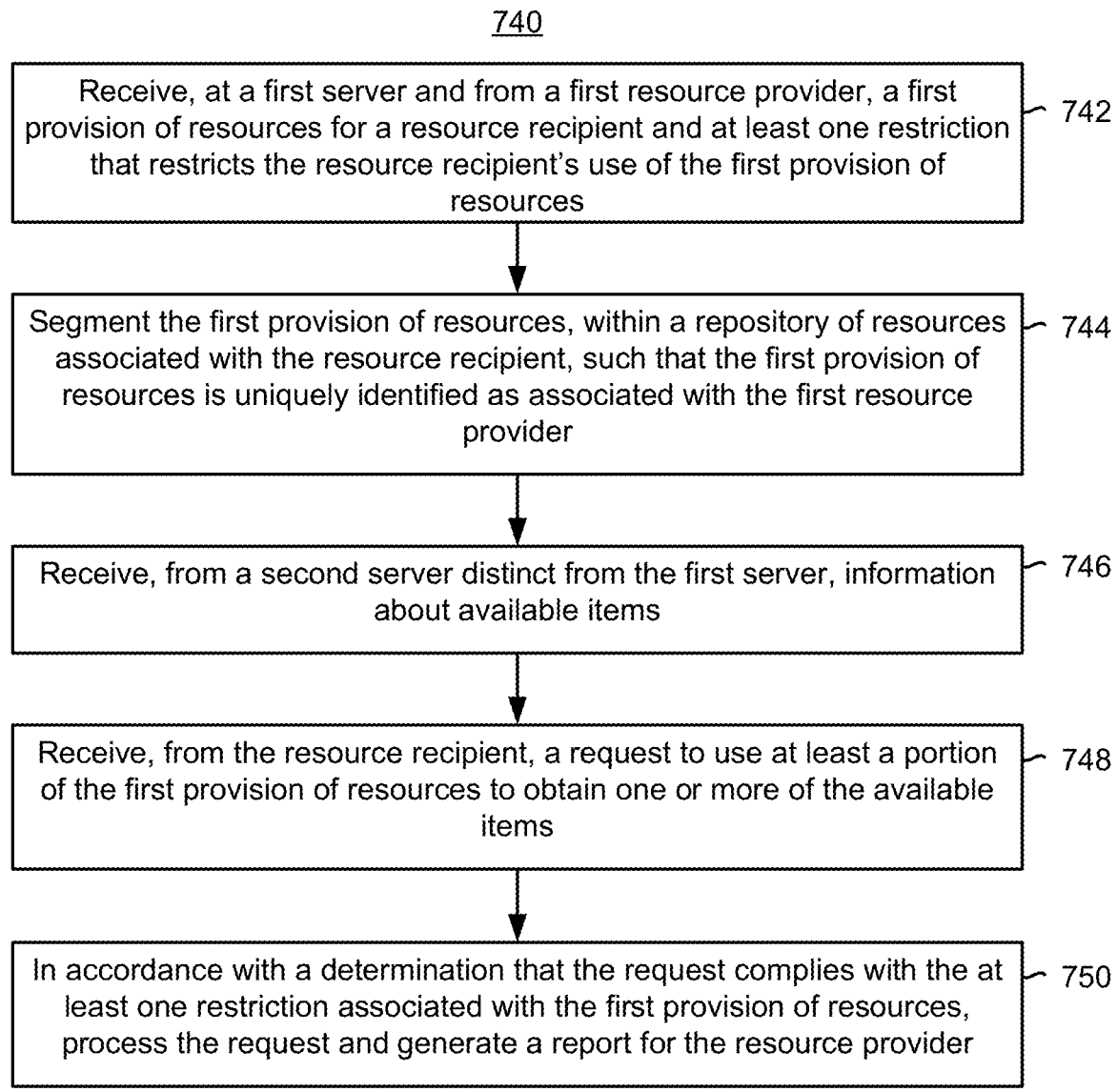
FIG. 7B is a flowchart representation of a method of distributing and allocating resources in a resource management system, in accordance with some embodiments.

Some embodiments combine, exchange, and/or reorder some of the processes or operations in FIGS. 7A-7B.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Disclosed embodiments address the deficiencies discussed above and provide for classroom resource management systems that update resource providers when the resources they provided are used by teachers to obtain educational items. The disclosed systems also provide customized reports based on access rights associated with each individual resource provider with respect to a single teacher.

Although some examples provided below are described with reference to teachers in educational environments receiving resources from parents, educational foundations, etc., the disclosed embodiments provided herein are capable of providing sophisticated allocation and tracking of resource distributions for a wide range of resource recipients, resource providers, and fundraising environments. For example, some embodiments provide for sophisticated allocation and tracking of resource distributions for users (i.e., resource recipients) associated with civic or non-profit organizations (such as Reading is Fundamental, Boys and Girls Clubs, Junior Leagues, Libraries, etc.) receiving resource distributions from their associated organizations.

Figure 1:
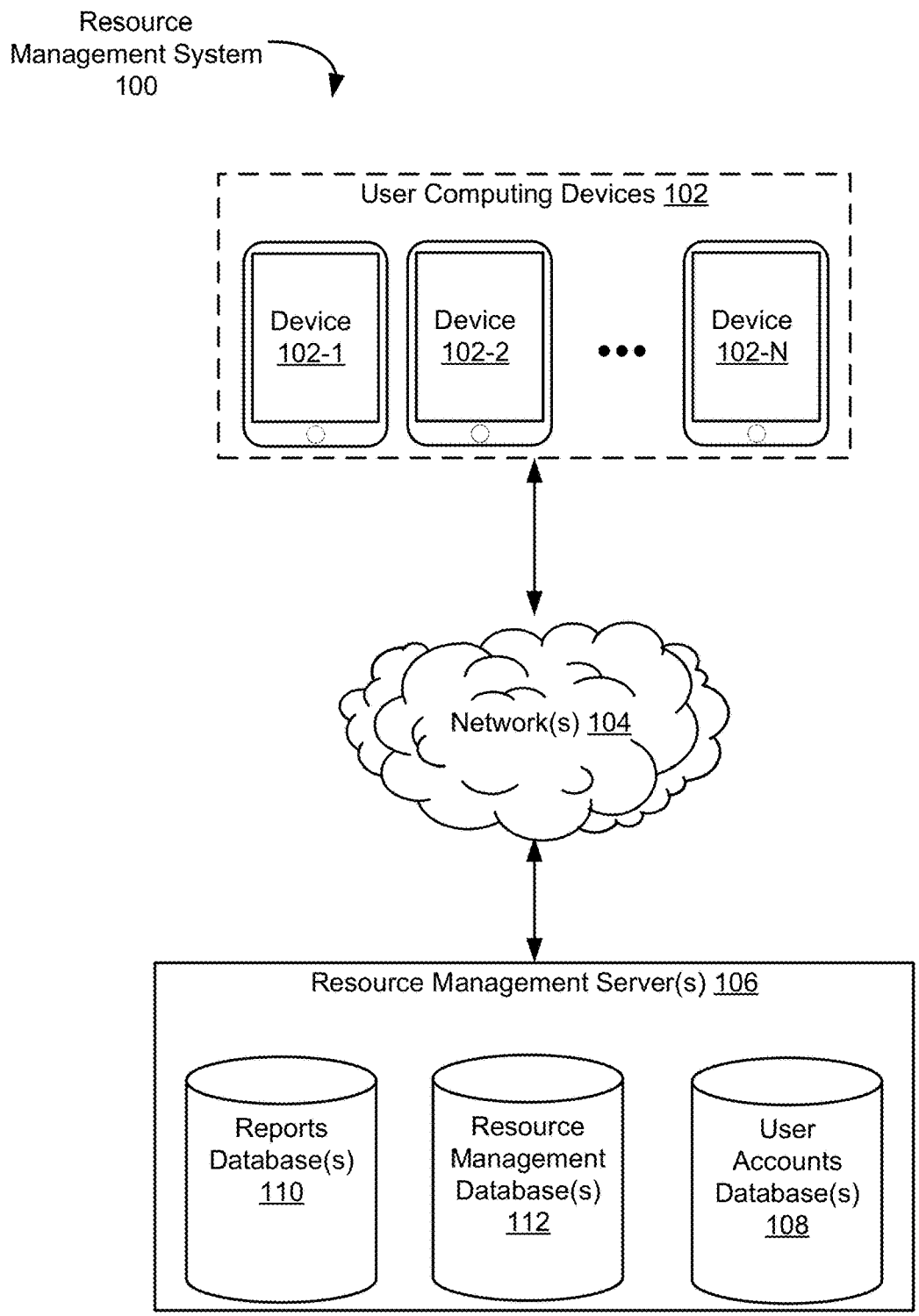
FIG. 1 illustrates an example resource management system, in accordance with some embodiments.

FIG. 1 illustrates a resource management system 100 in which some embodiments operate. One or more users each interact with one or more user computing devices 102 (also referred to as computing device 102 and device 102), such as a desktop computer, a laptop computer, a tablet computer, a tablet, a mobile computing device, a mobile phone, or a virtual machine running on such a device. An example computing device 102-1 is described below with respect to FIG. 2, including various software programs or modules that execute on the computing device 102-1. In some embodiments, the computing device 102-1 includes a web browser 220 (FIG. 2) that is capable of executing a resource allocation web application 222 (FIG. 2), a resource allocation local application 224 (FIG. 2), a resource management module 226, and a report generation module 228 that the computing device 102-1 (or an application installed thereon such as resource allocation application 224) uses to manage resource distributions. Some embodiments can manage resources for use in a classroom resource management system without connecting to external databases or programs over a network (i.e., the management of resources is performed exclusively on the user computing device 102-1).

In some embodiments of the resource management system 100, the user computing devices 102 communicate with the one or more resource management servers 106 over one or more networks 104. The one or more networks (e.g., network(s) 104) communicably connect each component of the resource management system 100 with other components of the resource management system 100. In some embodiments, the one or more networks 104 include public communication networks, private communication networks, or a combination of both public and private communication networks. For example, the one or more networks 104 can be any network (or combination of networks) such as the Internet, other wide area networks (WAN), local area networks (LAN), virtual private networks (VPN), metropolitan area networks (MAN), peer-to-peer networks, and/or ad-hoc connections.

Figure 2:
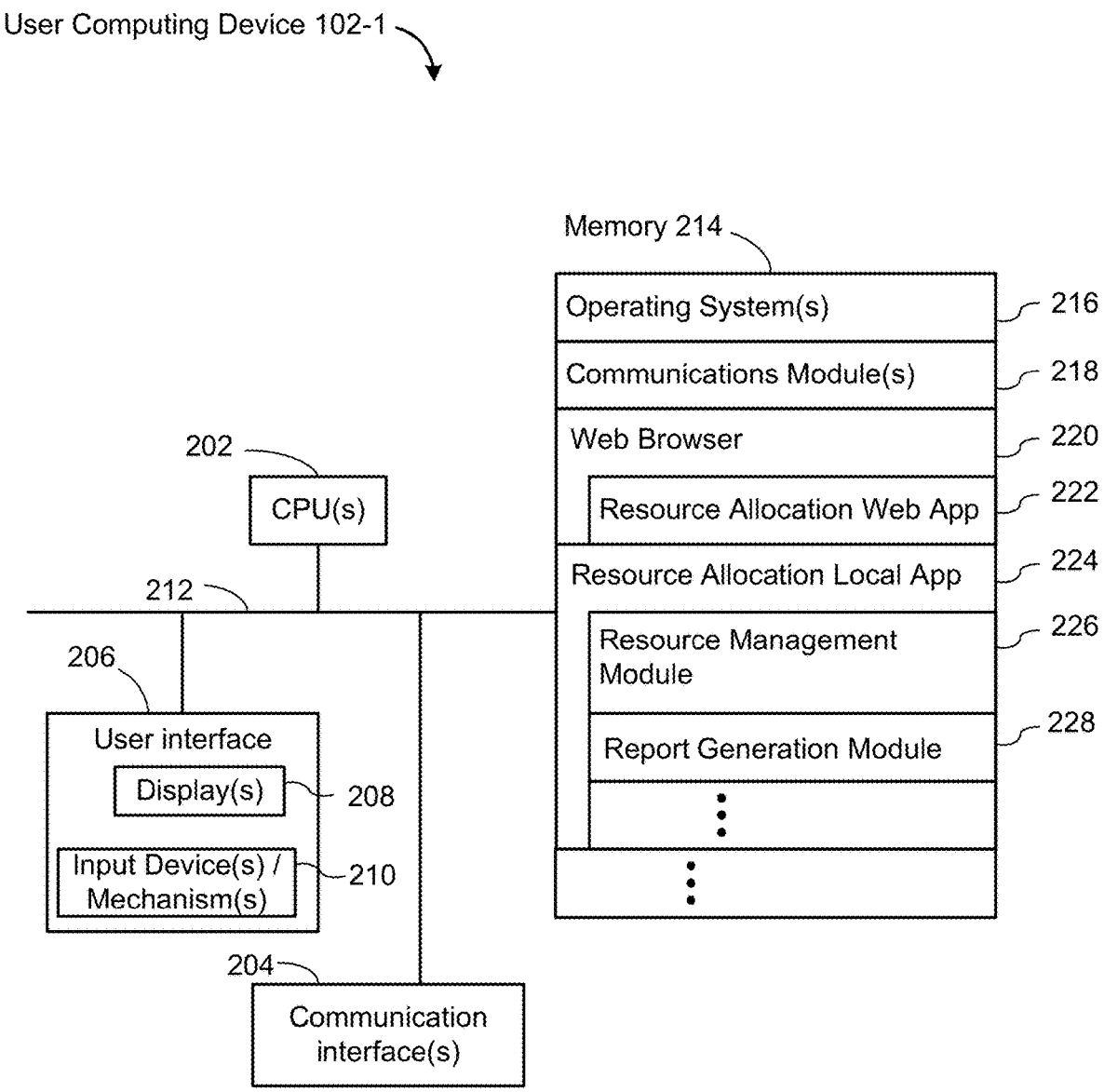
FIG. 2 is a block diagram of a computing device, in accordance with some embodiments.
Figure 3:
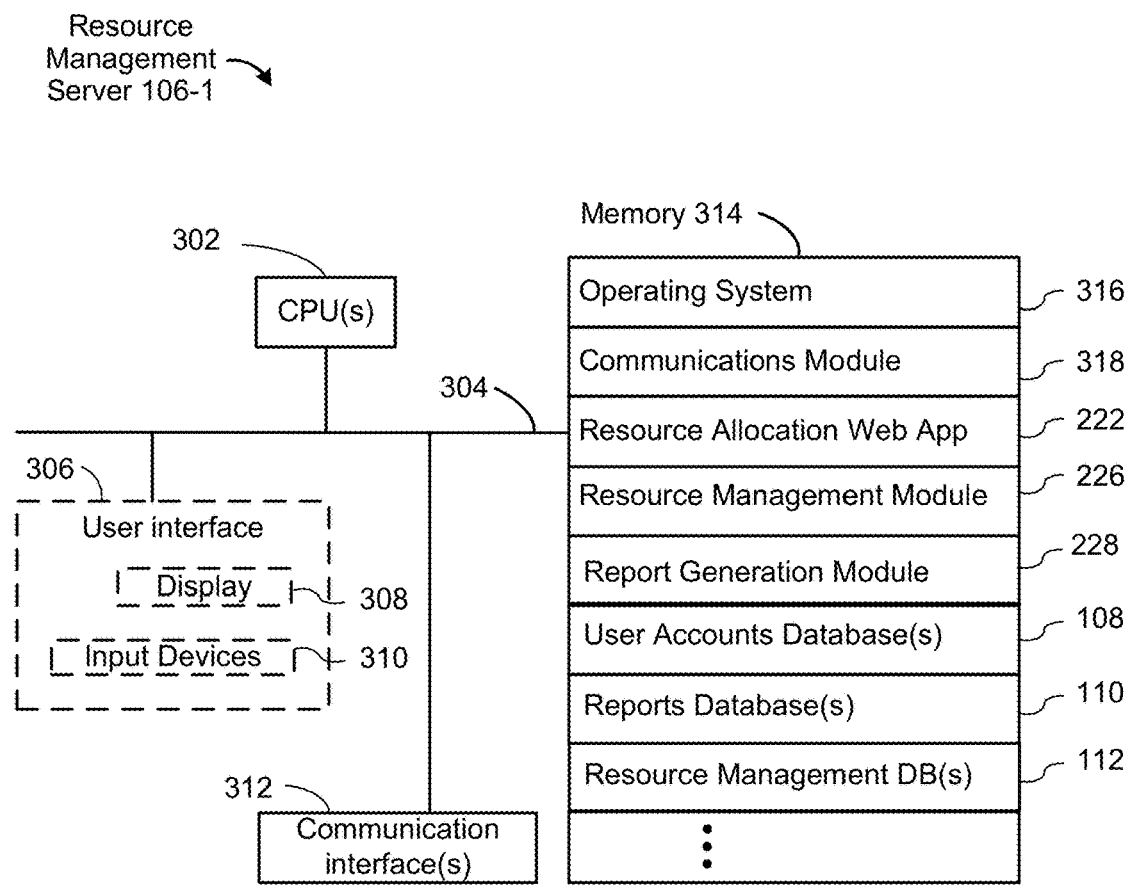
FIG. 3 is a block diagram of a resource management server, in accordance with some embodiments.

An exemplary resource management server 106-1 (also referred to herein as a server 106-1) is described in more detail with respect to FIG. 3. As mentioned above, some embodiments provide a resource allocation web application 222 (FIG. 2) that runs wholly or partially within a web browser 220 (FIG. 2) on the computing devices 102 (i.e., the computing devices 102 receive information about respective pages and data for the resource allocation web application 222 and then display that information). In some embodiments, resource management functionality is provided by both a resource allocation local application 224 and certain functions are provided by the one or more servers 106. For example, the one or more servers 106 may be used for resource-intensive operations.

In some embodiments, the computing devices 102 connect to one or more remotely-located resource management servers 106 through communication network(s) 104. In this way, some resource management operations can be performed remotely and computing resources at the computing devices 102 can be preserved for other operations. The one or more resource management servers 106, in some embodiments, include a resource management module 226 that monitors information corresponding to events associated with provisioned resources (e.g., expiration of provisioned resources based on access restrictions place on the resources by a resource provider, use of the provisioned resources to obtain education supplies, etc.). In some embodiments, the information corresponding to the events associated with the provisioned resources is stored in one or more resource management databases 112 for easy access and storage. In some embodiments, the one or more resource management databases 112 model data using a relational model, while in other embodiment, the one or more resource managements databases 112 model data using a document-oriented data model (e.g., using a platform such as MONGODB).

In some embodiments, the resource management system 100 is provided by a resource management service provider. The resource management service provider connects resource recipients (e.g., teachers requiring funds to purchase needed supplies for classroom learning and other educational purposes or users requiring funds to support activities associated with civic organizations) with resource suppliers able and willing to provide resources to the resource recipients.

In some embodiments, the resource management system 100 is a funding, spending and tracking platform. In some embodiments, a user's account (e.g., an account associated with a resource recipient) can be funded by a variety of sources (i.e., resource providers or funders) including, but not limited to, individuals, employers, organizations, civic organizations, non-profit groups, or teachers/users themselves. In some embodiments, resource recipients can utilize resources in a proprietary, e-commerce platform or using an integrated, reloadable prepaid debit card.

In some embodiments, the funders, as well as unrelated third parties such as employers/administrators (e.g., associated with a school or district that is associated with the resource recipient or associated with a civic organization that is associated with the resource recipient), receive real-time reporting of the purchases made using the resources provided through the resource management system 100. In some embodiments, the real-time reports include reports that are detailed to the SKU and pricing level which can then be easily and conveniently used for reconciliation and other business purposes. In some embodiments, the resource management service provider signs individual users up online and also attracts funders and school systems to adopt customized implementations of the resource management system 100 as an enterprise platform.

FIG. 2 is a block diagram illustrating one of the computing devices 102 (e.g., computing device 102-1) that a user uses to interact with a locally-installed resource allocation application (e.g., resource allocation local application 224) and/or to interact with a resource allocation web application (e.g., resource allocation web application 222) using a web browser (e.g., web browser 220), in accordance with some embodiments. A computing device 102-1 typically includes one or more processing units/cores (CPUs/GPUs) 202 for executing modules, programs, and/or instructions stored in the memory 214 and thereby performing processing operations; one or more network or other communications interfaces 204; the memory 214; and one or more communication buses 212 for interconnecting these components. The communication buses 212 may include circuitry that interconnects and controls communications between system components.

The computing device 102-1 also includes a user interface 206 that includes a display device 208 and one or more input devices or mechanisms 210. In some embodiments, the input device/mechanism 210 includes a keyboard; in some embodiments, the input device/mechanism includes a "soft" keyboard, which is displayed as needed on the display device 208, enabling a user to "press keys" that appear on the display 208. In some embodiments, the display 208 and input device/mechanism 210 comprise a touch-screen display (also called a touch-sensitive display).

In some embodiments, the computing device 102-1 has a memory 214 that includes high-speed random access memory, such as DRAM, SRAM, DDR RAM, or other random access solid state memory devices. In some embodiments, the memory 214 includes non-volatile memory, such as one or more magnetic disk storage devices, optical disk storage devices, flash memory devices, or other non-volatile solid-state storage devices. Optionally, the memory 214 includes one or more storage devices remotely located from the CPU(s)/GPUs 202. The memory 214, or alternately the non-volatile memory device(s) within the memory 214, comprises a non-transitory computer-readable storage medium. In some embodiments, the memory 214, or the non-transitory computer-readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 102-1 to computers and devices via the one or more communication interfaces 204 (wired or wireless) and one or more communication networks 104 (FIG. 1), such as the Internet, other wide area networks, local area networks, metropolitan area networks, and so on;
- a web browser 220 (or other client-side application capable of displaying web pages), which enables a user to communicate over a network with remote computers, servers, and/or devices. In some embodiments, the web browser 220 executes a resource allocation web application 222 provided by one or more resource management servers 106 (e.g., by receiving information about web pages from the server 106 as needed to fulfill requests to view information);
- a resource allocation local application 224, which enables users to interact with a resource management system 100 (FIG. 1). In some embodiments, the resource allocation local application 224 retrieves information from one or more databases 108, 110, 112 (FIG. 1) that are stored on one or more resource management server(s) 106, then generates and displays the retrieved information in user interfaces that allow the users to, for example, view reports, distribute resources, and spend resources (e.g., some exemplary user interfaces are shown in FIGS. 6 and 8A-8I). The resource allocation local application 224 also includes one or more of the following additional modules, or a subset or superset thereof:
  - a resource management module 226 for tracking events at the resource management system 100 and storing information about those events in one or more resource management databases 112 (FIG. 1); and/or
  - a report generation module 228 for retrieving information from one or more reports databases and rendering reports based on the retrieved information (and in accordance with user access rights as indicated by information stored in the user accounts databases 108).

Each of the above-identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various embodiments. In some embodiments, the memory 214 may store a subset of the modules and data structures identified above. Furthermore, the memory 214 may store additional modules or data structures not described above. In some embodiments, the programs, modules, and data structures stored in the memory 214, or the non-transitory computer-readable storage medium of the memory 214, provide instructions for implementing some of the methods described below.

Although FIG. 2 shows a computing device 102-1 in accordance with some embodiments, FIG. 2 is intended more as a functional description of the various features that may be present rather than as a structural schematic of the embodiments described herein. In practice, and as recognized by those of ordinary skill in the art, items shown separately could be combined and some items could be separated.

FIG. 3 is a block diagram illustrating a resource management server 106-1 (e.g., one or the one or more resource management servers 106, FIG. 1), in accordance with some embodiments. The resource management server 106-1 may host one or more user accounts databases 108, one or more reports databases 110, and one or more resource management databases 112, and may provide various executable applications or modules (for local execution at the server or for distribution across a network for execution at a web browser running at a client computing device). A server 106-1 typically includes one or more processing units (CPUs/GPUs) 302, one or more network interfaces 304, a memory 314, and one or more communication interface(s) 312 for interconnecting these components. In some embodiments, the server 106-1 optionally includes a user interface 306, which includes a display device 308 and one or more input devices 310, such as a keyboard and a mouse.

The memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some embodiments, the memory 314 includes one or more storage devices remotely located from the CPU(s)/GPUs 302. The memory 314, or alternately the non-volatile memory device(s) within the memory 314, includes a non-transitory computer-readable storage medium. In some embodiments, the memory 314 or the non-transitory computer-readable storage medium of the memory 314 stores the following programs, modules, and data structures, or a subset thereof:
- an operating system 316, which includes procedures for handling various basic system services and for performing hardware dependent tasks;
- a network communications module 318, which is used for connecting the server 106-1 to other computers via the one or more communication interfaces 304 (wired or wireless) and one or more communication networks 104 (FIG. 1), such as the Internet, other wide area networks, local area networks, metropolitan area networks, and so on;
- a resource allocation web application 222 (or information about the resource allocation web application that allows the server 106-1 to provide information to client computing devices for rendering web pages associated with the resource allocation web application 222), which may be downloaded and executed by a web browser 220 (FIG. 2) on a user's computing device 102 (FIG. 1);
- a resource management module 226 for tracking events at the resource management system 100 and storing information about those events in one or more resource management databases 112 (FIG. 1); and/or
- a report generation module 228 for retrieving information from one or more reports databases and rendering reports based on the retrieved information (and in accordance with user access rights as indicated by information stored in the user accounts databases 108).
- one or more databases 108, 110, 112 for storing information about the resource management system 100. In some embodiments, the one or more databases include one or more of the following, or a subset or superset thereof:
    - user accounts databases 108, storing information regarding access rights associated with respective resource providers with respect to respective resource recipients (i.e., information that allows for the generation of tailored reports that reveal only an appropriate level of information about resource allocation events based a type associated with the respective resource provider);
    - reports databases 110, storing information that allows for the rendering of tailored reports, as discussed in more detail below in reference to FIGS. 5A-5B; and/or
    - resource management databases 112, storing information that allows for detailed tracking and monitoring of events that affect provisioned resources (e.g., a resource expenditure event in which a teacher purchases an education item using resources provided by both a parent and an education fund, from separate purses associated with each of these resource providers or a resource expenditure event in which a user supports an activity associated with a civic group (purchasing supplies for an event with Boys and Girls Clubs) with resources provided by two distinct entities (e.g., two different individuals interested in supporting activities associated with Boys and Girls Clubs), as discussed in more detail below in reference to FIGS. 4A-4B.

Each of the above-identified executable modules, applications, or sets of procedures may be stored in one or more of the previously-mentioned memory devices, and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various embodiments. In some embodiments, the memory 314 may store a subset of the modules and data structures identified above. Furthermore, the memory 314 may store additional modules or data structures not described above. In some embodiments, the programs, modules, and data structures stored in the memory 314, or the non-transitory computer-readable storage medium of the memory 314, provide instructions for implementing some of the methods described below.

In some embodiments, the databases hosted at the server 106-1 (e.g., user accounts databases 108, reports databases 110, and/or resource management databases 112) are implemented using a document-oriented database (e.g., MONGODB or other similar implementation of the NoSQL paradigm). In some embodiments, the databases hosted at the server 106-1 are implemented using a relational database (e.g., a SQL database), while in still other embodiments, some of the databases are implemented using a document-oriented database (e.g., the resource management databases 112) and others are implemented using a relational database (e.g., the user accounts databases 108).

Although FIG. 3 shows a server 106-1 in accordance with some embodiments, FIG. 3 is intended more as a functional description of the various features that may be present rather than as a structural schematic of the embodiments described herein. In practice, and as recognized by those of ordinary skill in the art, items shown separately could be combined and some items could be separated (e.g., the information stored in the user accounts databases 108 could instead be stored with the information in the resource management databases 112). In addition, some of the programs, functions, procedures, or data shown above with respect to a server 106-1 may be stored on a computing device 102-1. In some embodiments, the functionality and/or data may be allocated between one or more computing devices 102 and one or more servers 106. Furthermore, one of skill in the art recognizes that FIG. 3 need not represent a single physical device. In many embodiments, the server functionality is allocated across multiple physical devices that comprise a server system. As used herein, references to a "server" or "resource allocation/management server" include various groups, collections, or arrays of servers that provide the described functionality, and the physical servers need not be physically collocated (e.g., the individual physical devices could be spread throughout the United States or throughout the world).

Figures 4A, 4B:
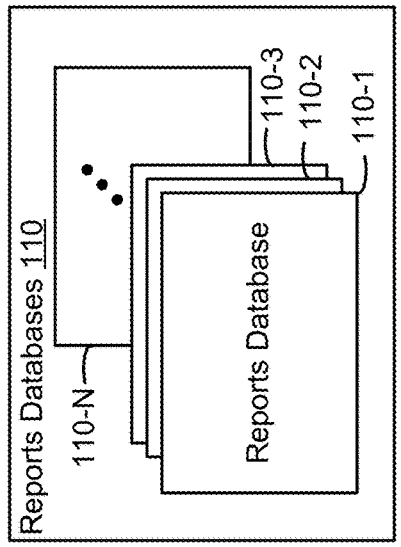
FIGS. 4A-4B are block diagrams illustrating data structures for storing information about reports, in accordance with some embodiments.

FIGS. 4A-4B are block diagrams illustrating data structures for storing information about reports that are generated based on user interactions with the resource management system 100, in accordance with some embodiments. As shown in FIG. 4A, reports databases 110 include a collection of data structures 110, optionally implemented as a collection of tables (or documents in a document-oriented data modeling paradigm) for each particular resource recipient in a resource management system 100, that each store information about reports associated with the particular resource recipient (e.g., reports data structure 110-1 stores information about reports associated with Teacher A (e.g., reports describing provisioned resources for Teacher A, reports described resources utilized by Teacher A to obtain educational supplies, etc.) and reports data structure 110-2 stores information about reports associated with User X (e.g., reports describing provisioned resources for User X, reports describing resources utilized by User X to obtain items needed for hosting events associated with a civic organization)). In some embodiments, each table (e.g., table 110-1, 110-2, 110-3 . . . 110-N) in the collection of reports data structures stores information about reports that are associated with more than one resource recipient (e.g., reports data structure 110-1 stores information about reports associated with a first resource recipient (e.g., Teacher A) and a second resource recipient (e.g., User X), because Teachers A and B both work at the same school or in the same school district or because Teachers A and B often request similar or overlapping educational supplies from related vendors, making storage in a single table an efficient option).

In some embodiments, one or more reports data structures 110 (e.g., reports data structure 110-1, FIG. 4B) are used for storing information about reports associated with a particular resource recipient of the resource management system 100. As illustrated in FIG. 4B, reports data structure 110-1 contains data (e.g., report ID, provider, recipient, resource provision ID and name, status, and report contents) associated with reports for Teachers A and B. In some embodiments, the data is stored in individual records 410-1, 410-2, 410-3, 410-4, through 410-N. In some embodiments, a header field 410-0 is used to describe each field of information associated with each of the respective records. Header 410-0, in some embodiments, contains a brief description of each field of information (e.g., each field associated with each of the records) stored within the table. As shown in FIG. 4B, header 410-0 indicates that each record 410-1, 410-2, 410-3, 410-4, through 410-N stores the following information and data structures, or a subset or superset thereof:

a value for a "report ID" field that uniquely identifies each report that is stored in the reports database 110-1;

a value for a "provider" field that provides a description of the resource provider that is associated with each record (e.g., information identifying the resource provider for which the report is being generated, for example, in response to a resource recipient using resources that were provided by the resource provider, a report is generated and stored in a respective record of reports database 110-1 for that resource provider);

a value for a "recipient" field that corresponds to information identifying a resource recipient that is associated with each record;

a value for a "resource provision ID and name" field that corresponds to information about the provisioned resource that corresponds to each record/report and a unique identifier ("ID") for the provisioned resource;

a value for a "status" field that includes information identifying a current status of the report that is associated with each record (e.g., viewed, emailed, available upon login, etc.); and a value for a "report contents" field that includes content that is tailored to access rights corresponding to the provider's permissions to view resource allocation events (disbursements, expenditures, expirations, etc.) associated with the resource recipient. For example, if the provider is of a first type (e.g., a parent), then the content is tailored to include only information about resources provided directly by the parent, while if the provider is of a second type (e.g., an educational foundation), then the provider is able to see additional information in the report that the first type of providers are not authorized to view.

In some embodiments, reports data structure 110-1 includes fields in addition to the fields described above, such as a timestamp field that identifies when a respective report was created and/or stored in the table 110-1 and a related reports field that includes one or more report ID values that correspond to related reports (e.g., reports generated for a plurality of resource providers that provided resources used to purchase a single item).

As shown in FIG. 4B, the reports data structure 110-1 includes records 410-1, 410-2, 410-3, 410-4, through 410-N. As one example of the information stored in an exemplary record in the reports data structure 322-1, record 410-1 stores a value of "1" in the report ID field, a value of "Ed Fund 1" in the provider field, a value of "Teacher A" in the recipient field, a value of "2: Fall Supplies" in the resource provision ID and name field (in this example, 2 is the ID and Fall Supplies is the name for the respective resource provision), a value of "Viewed" in the status field, and descriptive information that is used to generate the report in the report contents field (e.g., a template, information associated with a JSON object, or other information that can be used to render the report on-the-fly, etc.).

Although illustrated as a particular implementation of a data structure (e.g., a table), the data structures of FIGS. 4A-4B, in some embodiments, are implemented in XML files, tables within a relational database, a document-oriented database, text files, and/or any other suitable format for storing data.

Figures 5A, 5B:
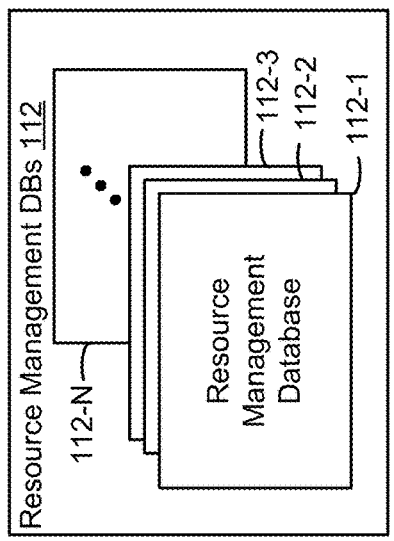
FIGS. 5A-5B are block diagrams illustrating data structures for storing information about resource allocations and distributions, in particular events that affect the allocation and distribution of resources, in accordance with some embodiments.

FIGS. 5A-5B are block diagrams illustrating data structures for storing information about events affecting provision resources in a resource management system, in accordance with some embodiments. As shown in FIG. 5A, resource management data structures 112 include a collection of data structures 112, optionally implemented as a collection of tables for each particular resource recipient on the resource management system 100, that each store event information associated with the particular resource recipient (e.g., resource management data structure 112-1 stores events associated with resources provisioned for Teacher A and resource management data structure 112-2 stores events associated with resources provisioned for Teacher B). In some embodiments, each table (e.g., table 112-1, 112-2, 112-3 . . . 112-N) in the collection of resource management data structures stores event information for more than one resource recipient (e.g., for all teachers at a particular school or school district.

In some embodiments, one or more resource management data structures 112 (e.g., resource management data structure 112-1, FIG. 5B) are used for storing event information associated with a resource recipient. As illustrated in FIG. 5B, resource management data structure 112-1 contains data (e.g., event ID, resource ID, resource provision name, event type, amount, and event details) associated with events that affect provisioned resources for the resource recipient. In some embodiments, the data is stored in individual records 510-1, 510-2 through 510-N. In some embodiments, a header field 510-0 is used to describe each field of information associated with each of the respective records. Header 510-0, in some embodiments, contains a brief description of each field of information (e.g., each field associated with each of the records) stored within the table. As shown in FIG. 5B, header 510-0 indicates that each record 510-1, 510-2 through 510-N stores the following information and data structures, or a subset or superset thereof:
- a value for an "event ID" field that uniquely identifies each event stored in the resource management database 112-1;
- a value for a "resource ID" field that uniquely identifies each particular provisioned resource (i.e., each distribution of resources that was provided to a respective resource recipient);
- a value for an "resource provision name" field that specifies a name that is associated with each particular provisioned resource;
- a value for an "event type" field that specifies a type for the event that is associated with each respective record (e.g., provision, expenditure, expiration, etc.);
- a value for an "amount" field that specifies an amount of the provisioned resources that are affected/impacted by the event; and
- a value for an "event details" field that includes information identifying specific details associated with each respective event (e.g., information identifying where the provisioned resources were utilized).

As shown in FIG. 5B, the resource management data structure 112-1 includes records 510-1, 510-2 through 510-N. As one example of the information stored in an exemplary record in the resource management data structure 112-1, record 510-1 stores a value of "1" in the event ID field, a value of "2" in the resource ID field, a value of "Fall Supplies" in the resource provision name field, a value of "provision" in the event type field, a value of "100.00" in the amount field, and details about the event in the event details field.

Although illustrated as a particular implementation of a data structure (e.g., a table), the data structures of FIGS. 5A-5B, in some embodiments, are implemented in XML files, objects within a document-oriented database, tables within a relational database, text files, and/or any other suitable format for storing data.

Figure 6:
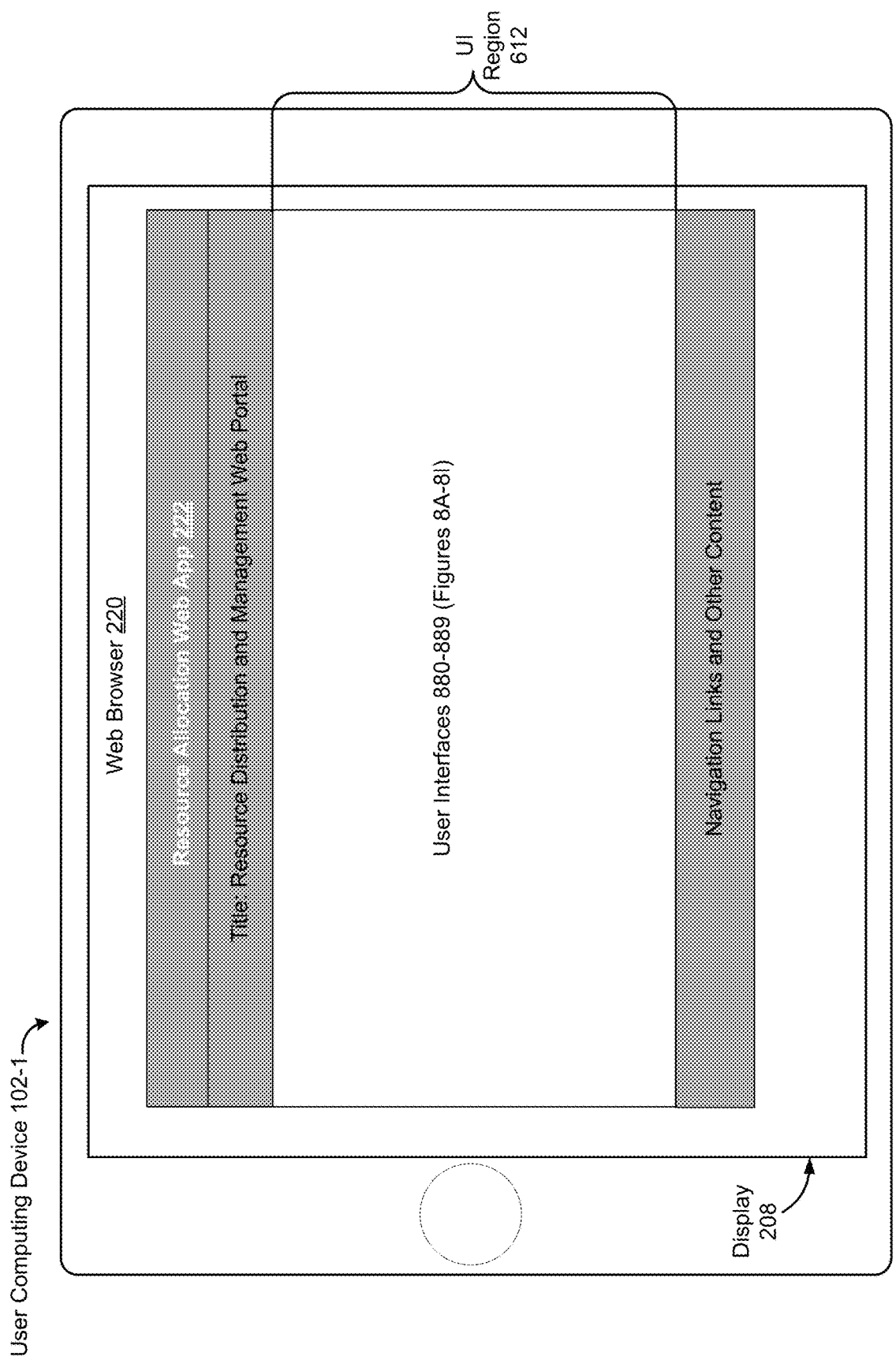
FIG. 6 is a schematic of a display used to illustrate a user interface for displaying and interacting with information about resource allocations, in accordance with some embodiments.

Turning now to FIG. 6, a schematic of a display is shown and used to illustrate user interfaces for displaying and interacting with information about resource allocations, in accordance with some embodiments. For ease of reference, the user interfaces discussed below are described as displayed within a web browser but, in other embodiments, the user interfaces may be displayed within a locally-installed application, such as a mobile phone or desktop application (e.g., resource allocation location application 224). The user interfaces described in reference to FIG. 6 are merely exemplary and additional user interfaces for classroom resource management systems are also shown in FIGS. 8A-8I (as discussed in more detail below) and may be used to perform some of the functions described with respect to the user interfaces in FIG. 6.

As shown in FIG. 6, a web browser (e.g., web browser 220, FIG. 2) of a user computing device (e.g., user computing device 102-1) is used to render information received from a server (e.g., one or more resource management servers 106, FIG. 1) in order to display a resource allocation web application (e.g., resource allocation web application 222, FIG. 2). In some embodiments, the resource allocation web application renders the user interfaces shown in FIGS. 8A-8I. In some embodiments, the displayed user interfaces allow educational foundations to provide resources (e.g., funds) to teachers. For example, a respective educational foundation might use resource management system 100 to distribute grant funding to teachers to help make sure that the respective educational foundation is able to easily track the use of those dollars for internal accounting and audit purposes (as well as easily provide transparency of funding activity to school administrators). As another example, a civic organization might use resource management system 100 to distribute funding to various users so that the civic organization can easily track the use of those distributed funds for internal accounting and auditing purposes (as well easily provide transparent of funding activity to administrators associated with the civic organization).

In some embodiments, a process for allowing educational foundations (and other resources providers, such as civic organizations or administrators associated with (or acting on behalf of) civic organizations) to use the resource management system 100 to provide funds to individual teachers is as follows:
  (i) a respective educational foundation signs a master service agreement and loads funds via ACH onto the resource management system 100 into its enterprise wallet (e.g., using an "Add Funds" tab, such as that shown in FIG. 8F);

(ii) teachers' wallets are allocated;
(iii) the respective educational foundation then creates a distribution ID (i.e. Fall 2015 Science Grant) and moves funds into user's individual wallets (peer to peer);
(iv) the distribution ID may have certain attributes such as an expiration date, vendor restrictions, etc. and tracking of purchases are tied back to this distribution ID identifier;
(v) teachers may spend funds that were moved into their respective digital wallets on the resource management system 100 (e.g., by interacting with user interfaces such as those shown in FIGS. 8B-8E), or outside the system with a prepaid debit card (in some embodiments, this is a prepaid account, so the balance of the wallet is the available balance for the prepaid card);
(vi) teachers may submit receipts to the resource management system 100 for reimbursement (e.g., by interacting with user interfaces, such as those shown in FIGS. 8B-8E);
(vii) users may also pay vendors directly (a feature that is sometimes called DirectPay) into the vendors' bank accounts after the vendors had registered with the resource management system 100 by signing online and linking their bank accounts;
(viii) a teacher may overspend their account online only by paying the balance of the transaction cost with a credit card; and
(ix) the respective foundation gets visibility to all transactions attached to funds they distributed and associated with the distribution ID created at the time of funds distribution.

In some embodiments, a funder (e.g., the educational foundation in the example above), or an administrator, gets visibility to the purchases associated only with their granted/provisioned funds. For example, the foundation gets visibility to (and access to information regarding) purchases associated with the use of its fund, while the PTA gets visibility (and access to information regarding purchases associated with the use of its funds (and appropriate reports are generated according to these access rights). In some embodiments, the employer (the school or the school district administrator) gets full visibility of all transactions associated with all teachers in the school or the school district: all money disbursed to individual teachers and all spending by these individual teachers using the disbursements.

Figure 8A:
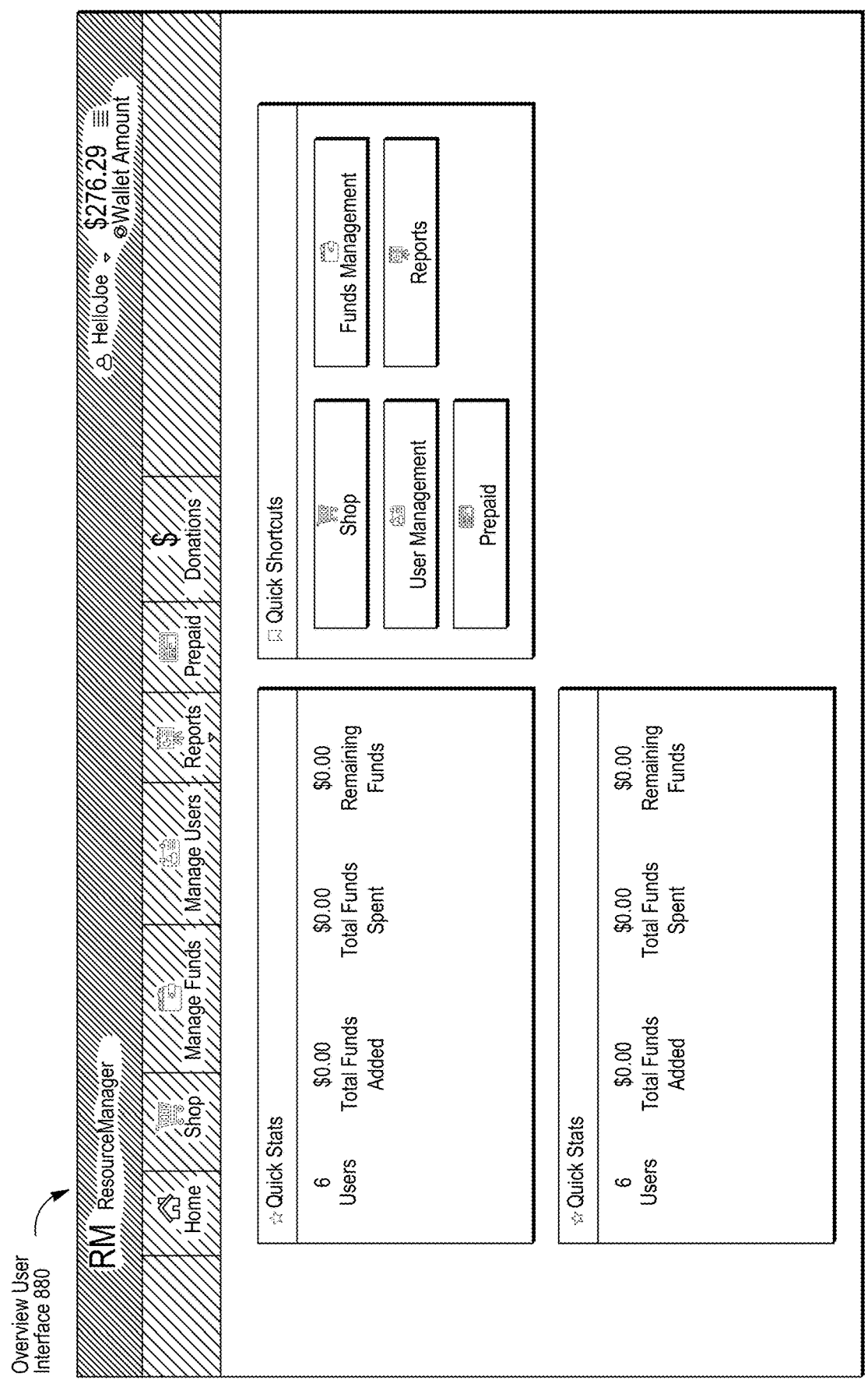
Figure 8B:
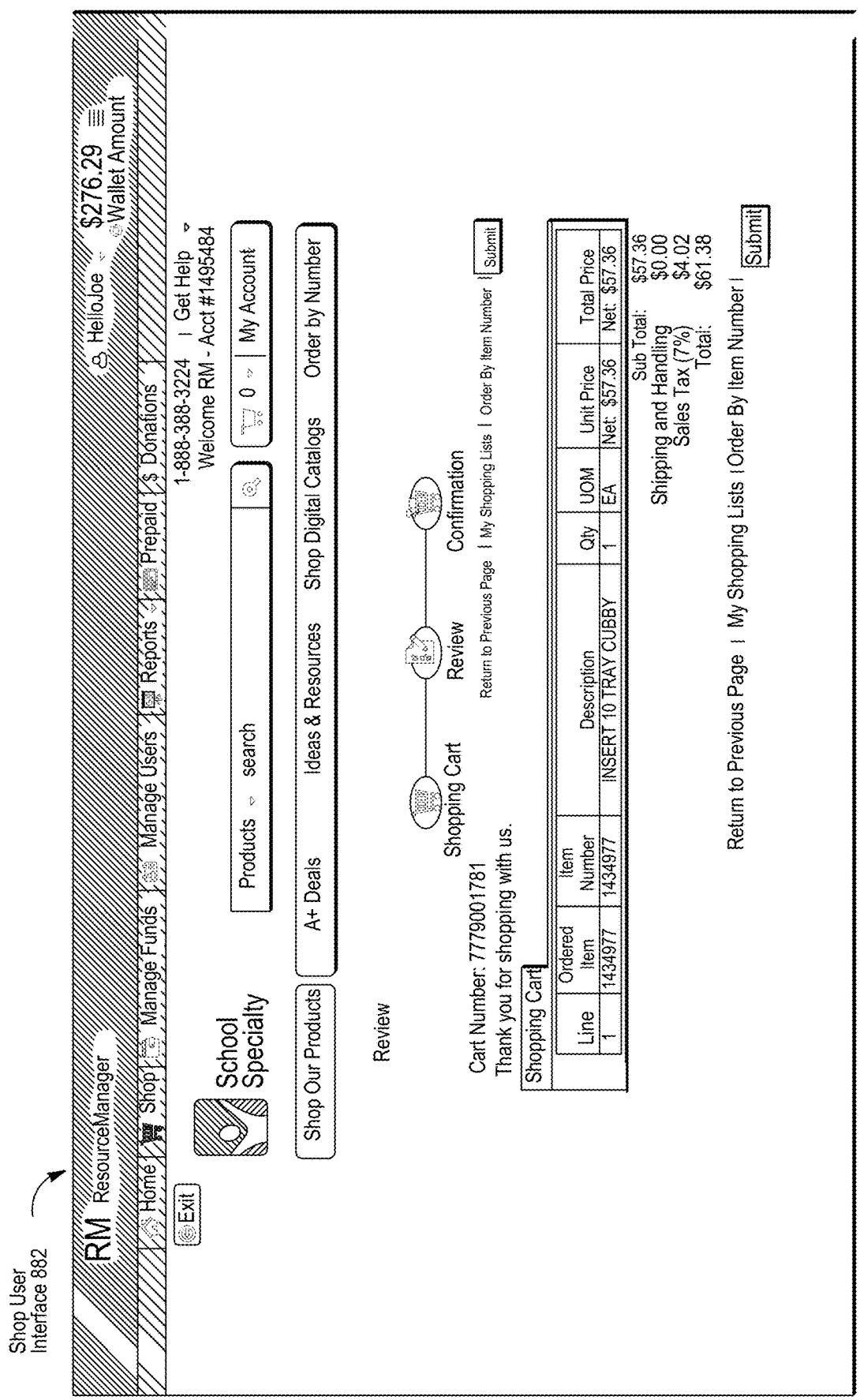
Figure 8C:
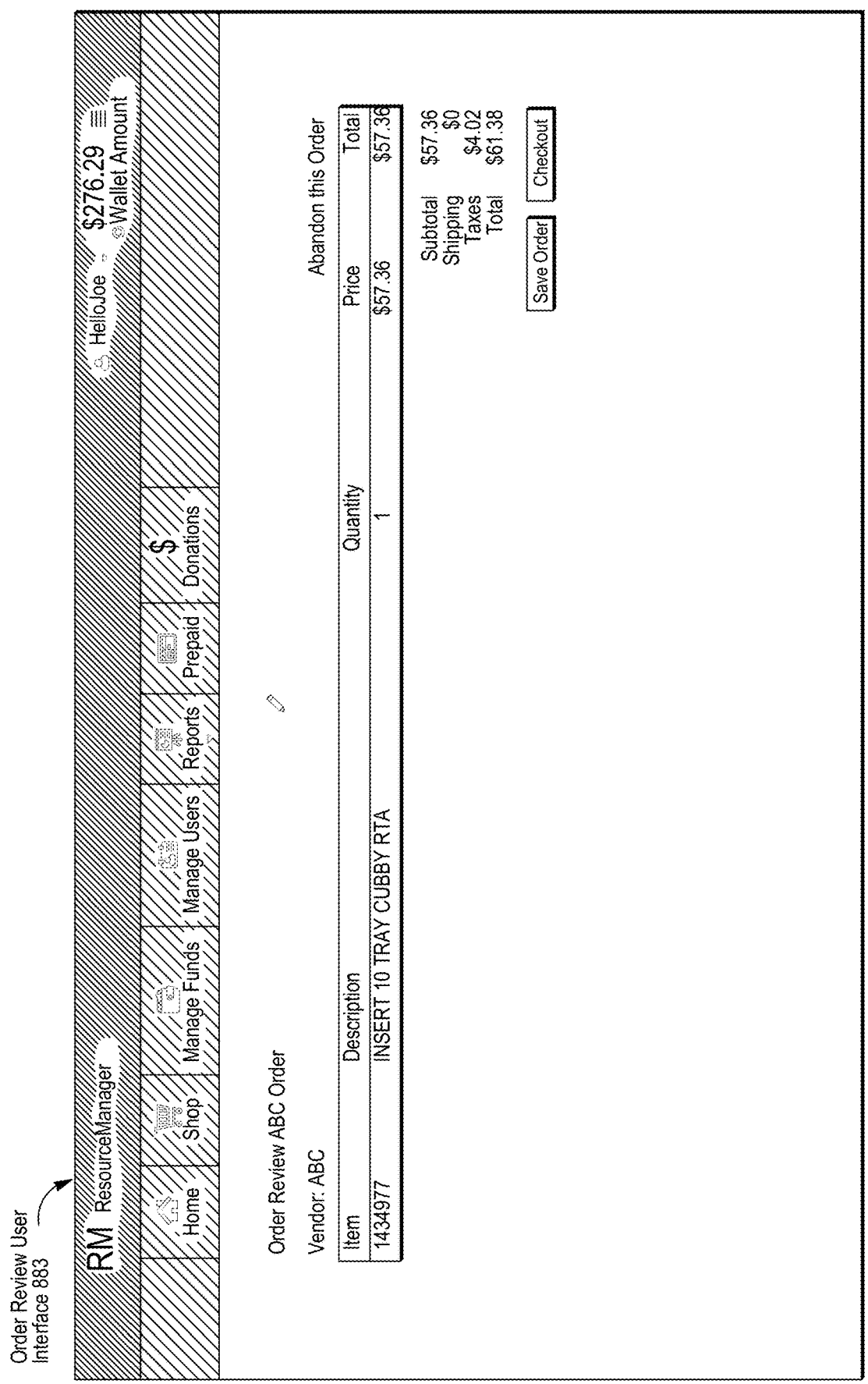
Figure 8D:
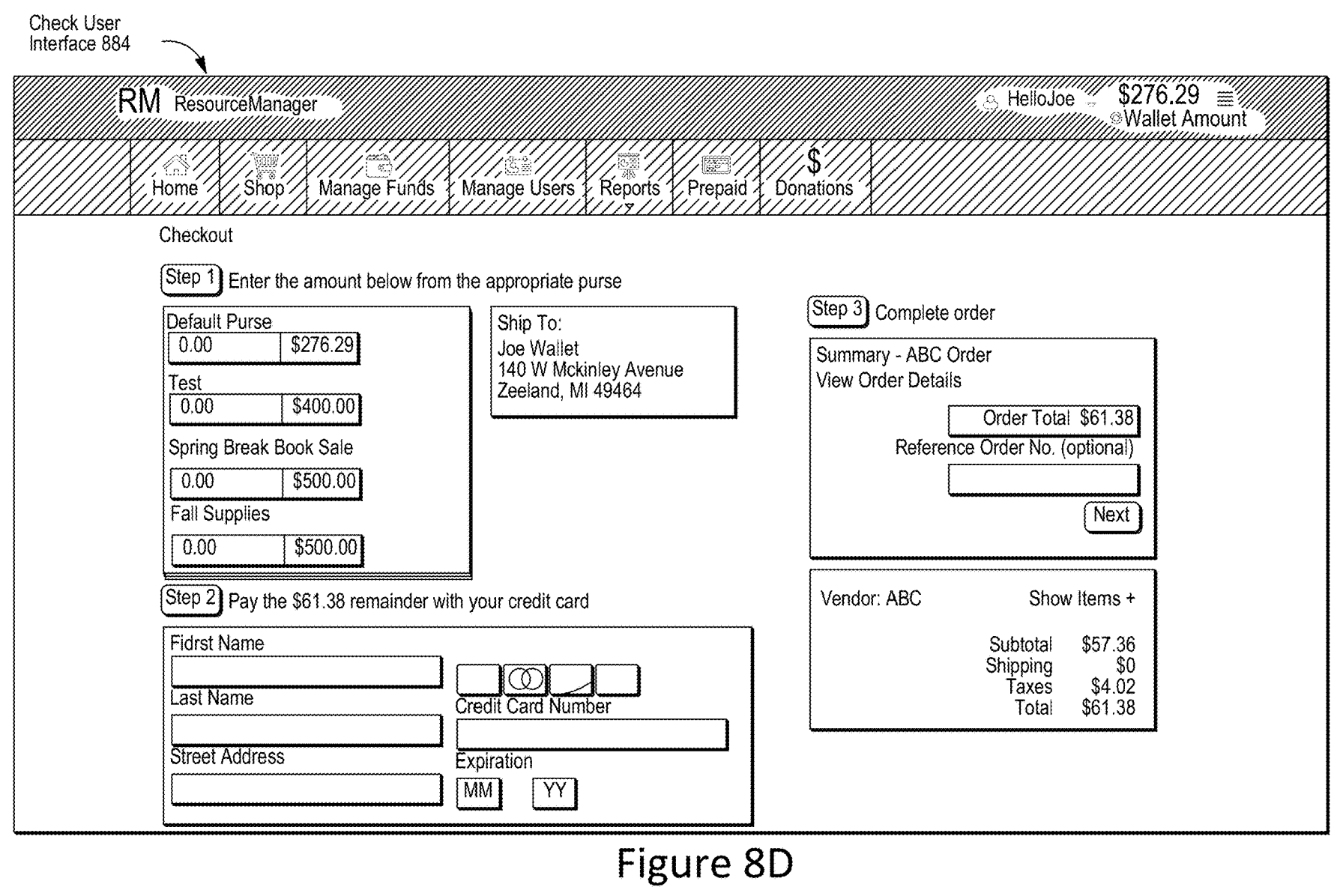
Figure 8E:
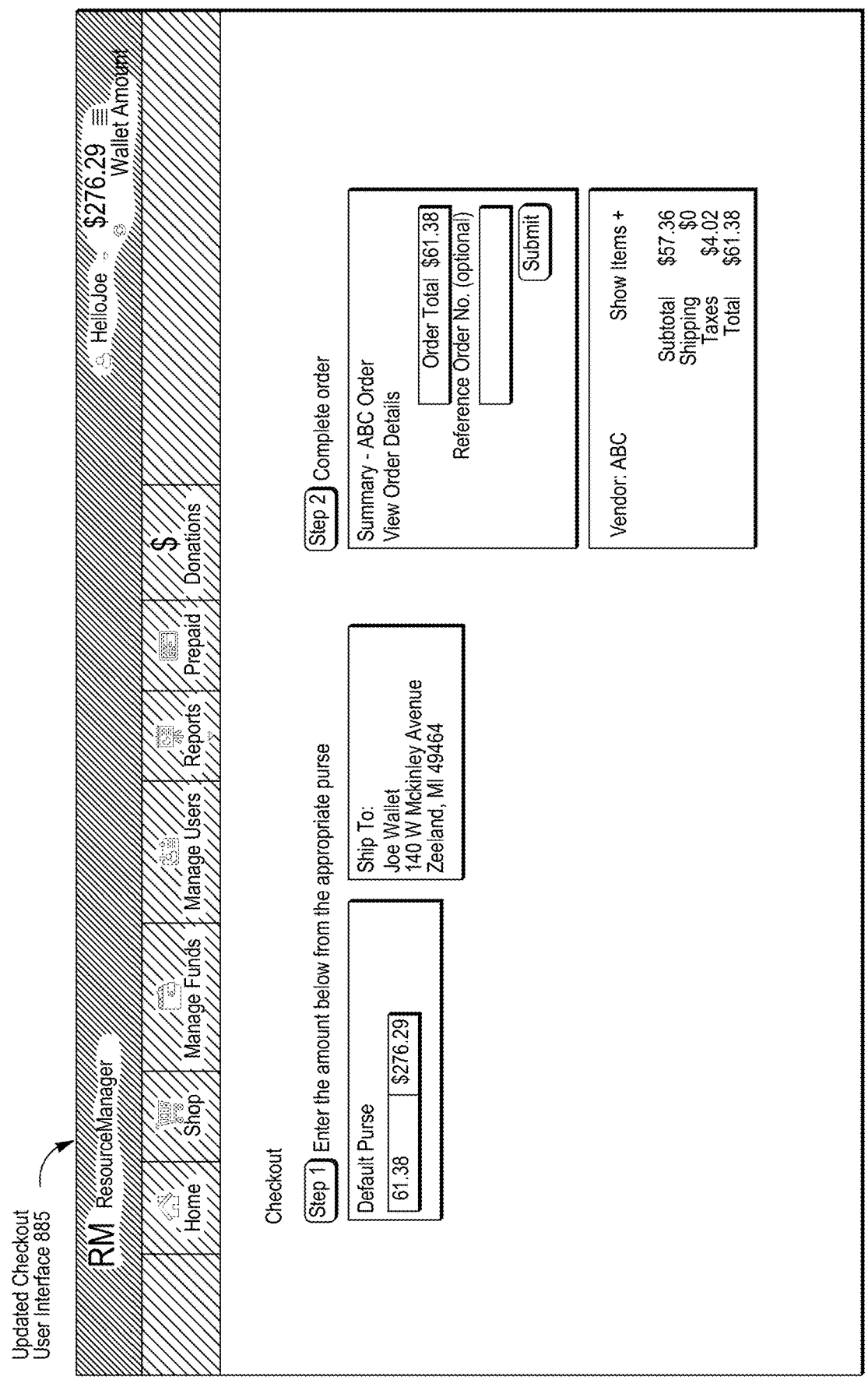
Figure 8F:
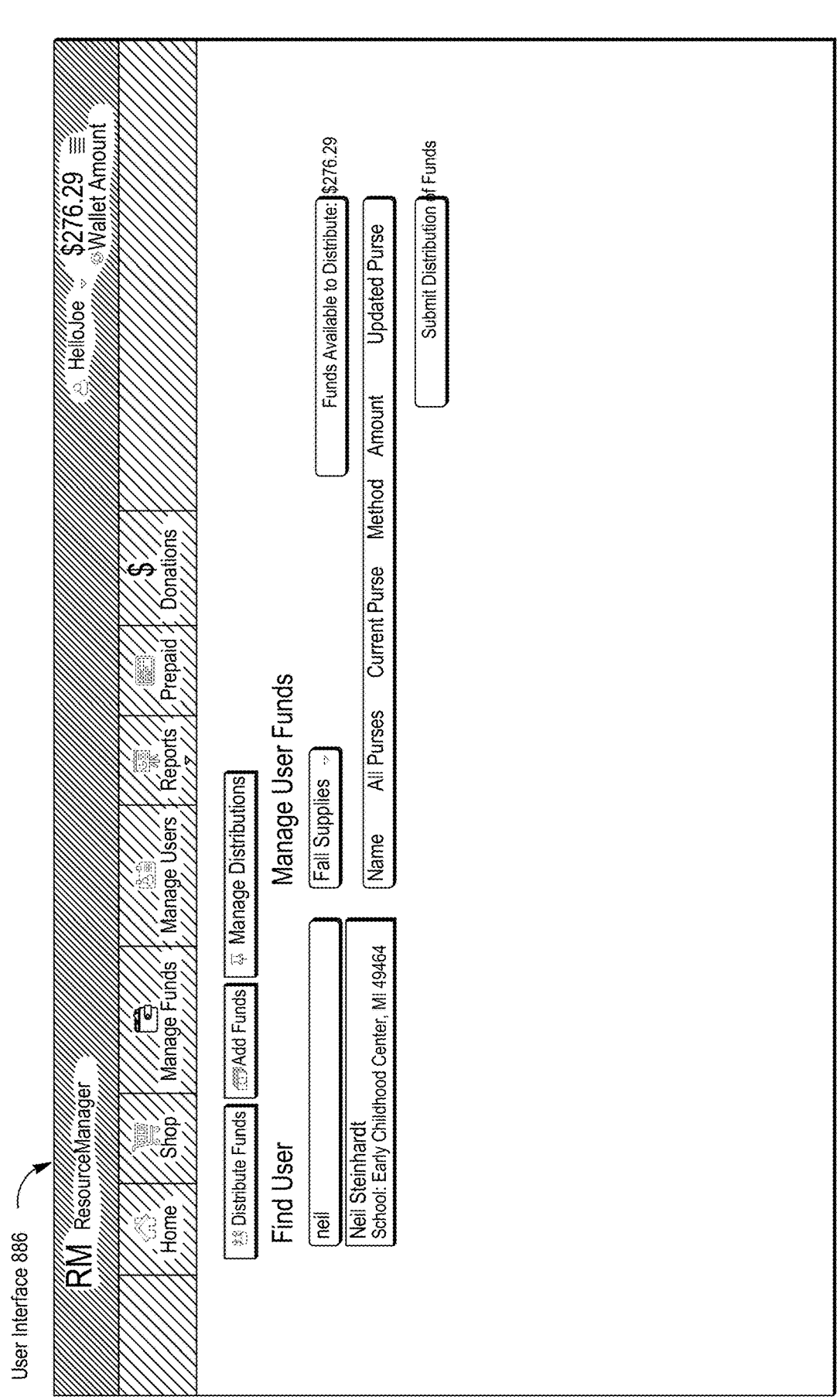

In some embodiments, the digital wallets described above are segmented using purses (e.g., an example purse is illustrated in the user interface shown in FIG. 8E). In this way, spend may be tracked by respective funders. In some embodiments, a funder creates a purse in a user's wallet by creating a distribution ID at the point of distribution. In some embodiments, the distribution ID by default is the label of the purse in the user's wallet.

In some embodiments, each purse can have certain attributes including, but not limited to, an expiration date or spending restrictions (vendor or SKU level can/cannot be used on the debit card, etc.). In some embodiments, purses can be created for or restricted from debit card, DirectPay (as described above), or designated to receive reimbursements. When the user checks out using an e-commerce platform available through the resource management system 100 (e.g., as shown in user interface of FIG. 8B), the user must select a purse from which to withdraw funds (e.g., as shown in FIGS. 8D-8E). In this way, details of that e-commerce cart are associated with that purse, which in turn provides the funder of that purse distinct visibility to the details of the e-commerce transaction, but not to details of other transactions the user may have made using with his wallet, unaffiliated with that purse.

In some embodiments, reporting is tied back to the purses. For example, a funder will get visibility only to the purchases made from a purse they funded. Each wallet comes with a generic unrestricted purse (e.g., default purse shown in FIG. 8E). Unless another purse is created or designated, any funding will come in to the unrestricted purse.

One illustration of a digital wallet and its segmentation into purses is in Table 1 below:

TABLE 1

Example Digital Wallet Segmented into Purses
WALLET

| Purse | Expiry | Vendor | SKU |
| --- | --- | --- | --- |
| Unrestricted | None | None | None |
| Fall Supplies | Nov. 30, 2015 | None | None |
| Amazon15 | Jun. 1, 2016 | Amazon | None |
| Office Depot | Dec. 13, 2015 | Office Depot | 9474** Acer Chromebook |

Another illustration of a digital wallet and its segmentation into purses is in Table 2 below:

TABLE 2

Example Digital Wallet Segmented into Purses
WALLET

| Purse | Expiry | Vendor | SKU |
| --- | --- | --- | --- |
| Unrestricted | None | None | None |
| Prepaid Field Trip | Sep. 25, 2018 | CFSB Bank | Bus Company |
| Fall Supplies | Dec. 31, 2018 | Amazon | 5648** Acer Chromebook |
| Tuition | Nov. 1, 2018 | St Francis Prep | None |

As illustrated in Tables 1 and 2, one or more of a resource provider, resource recipient, a user, a donor, a funder, or a vendor creates a purse (shown in the first column), according to some embodiments. In some embodiments, there is an expiration date or restriction associated with a purse. In some embodiments, there is a vendor restriction associated with each purse. In some embodiments, there is a SKU restriction associated with each purse. Also, one or more of a resource provider, resource recipient, a user, a funder, a vendor, or a donor has visibility to reports generated by the system described herein, according to some embodiments.

As an example of the use of purses, a Local Education Foundation may create a distribution ID called "Fall Supplies" (as shown in FIG. 8D). This distribution is created with an expiration date of Nov. 30, 2015. Twenty teachers in a district associated with the Local Education Foundation may each be provided with $500 from this distribution and these distributed resources will go into a new purse in each of their accounts (and a new record will be created in the appropriate resource management database, FIGS. 5A-5B, reflecting this resource provisioning event). In order for the Local Education Foundation to get visibility to transactions associated with this distribution, users select funds (all or a portion of funds from respective purses to pay for items in a current shopping cart, which may include items from multiple services, such as AMAZON, BEST BUY, and other vendors of education supplies) at checkout, e.g., using a user interface such as the one shown in FIG. 8D (the user interface may be displayed in UI region 612, FIG. 6, e.g., as part of a checkout user interface 884, FIG. 8D).

In some embodiments, the steps shown in FIG. 8D change based on how funds are allocated between individual purses and a user's credit card. For example, if a user selects to pay for all items in a shopping cart using resources from individual purses (and without using a credit card at all), then Step 2 is "Complete Order" and no option is presented to allow partial payment via a credit card (as shown in FIG. 8E). In some embodiments, by default, a step 2 is shown to allow users to provide partial payment via a credit card and, in accordance with a determination that all items in a shopping cart are paid for using funds from purses, then the user interface portion that allows for inputting partial payment via credit card is no longer displayed. Additionally, the text "Pay the [$X amount] remainder with your credit card] is updated as a user changes inputs provided in Step 1 (e.g., as a user adds "$10" to be taken out of one of the purses, the $X amount is reduced by $10 as well, so that a user has a clear visual indication as to whether a card credit may be needed to pay for all items in a shopping cart).

In some embodiments, resources are pulled out of a user wallet/purse in conjunction with a transaction after a user selects how they would like to pay for items using funds available in each of their purses (e.g., the user in the above example may pay for the order shown above by using funds available from one or multiple purses). In some embodiments, funds in the digital wallets are associated with an expiration date (e.g., an expiration date for all funds associated with a distribution ID). If any funds remain associated with that distribution ID at the date of expiration, funds automatically are withdrawn and returned to the funder (e.g., an Enterprise user wallet account associated with the funder).

In some embodiments, funders are able to associate distributions with a specific expiration date and/or are able to withdraw funds from individual users on an as-needed basis. As a specific example, an example education foundation distributes $250 to a teacher for the Fall Supply grant that must be fulfilled by Dec. 31, 2015. Example A: Teacher has $15.50 remaining. On Jan. 1, 2016, the system 100 automatically withdraws the $15.50 balance from the user wallet for the teacher and re-deposits it to the example education foundation's enterprise wallet. Example B: The example education foundation learns a teacher is no longer teaching and has left her position before using the funds (or, the system 100 automatically notifies the example education foundation regarding the teacher's departure, so that they may decide what to do with unused resource distributions). The example education foundation may log into its enterprise dashboard and withdraw funds from the teacher's wallet (as pictured in the user interfaces of FIGS. 8G-8H, an authorized user for the example education foundation may tap a minus affordance to withdraw funds from a particular purse or may enter a specific amount into a respective "Amount" input box of FIG. 8H in order to withdraw a specific amount of funds without having to use the "−" affordance).

Figure 8G:
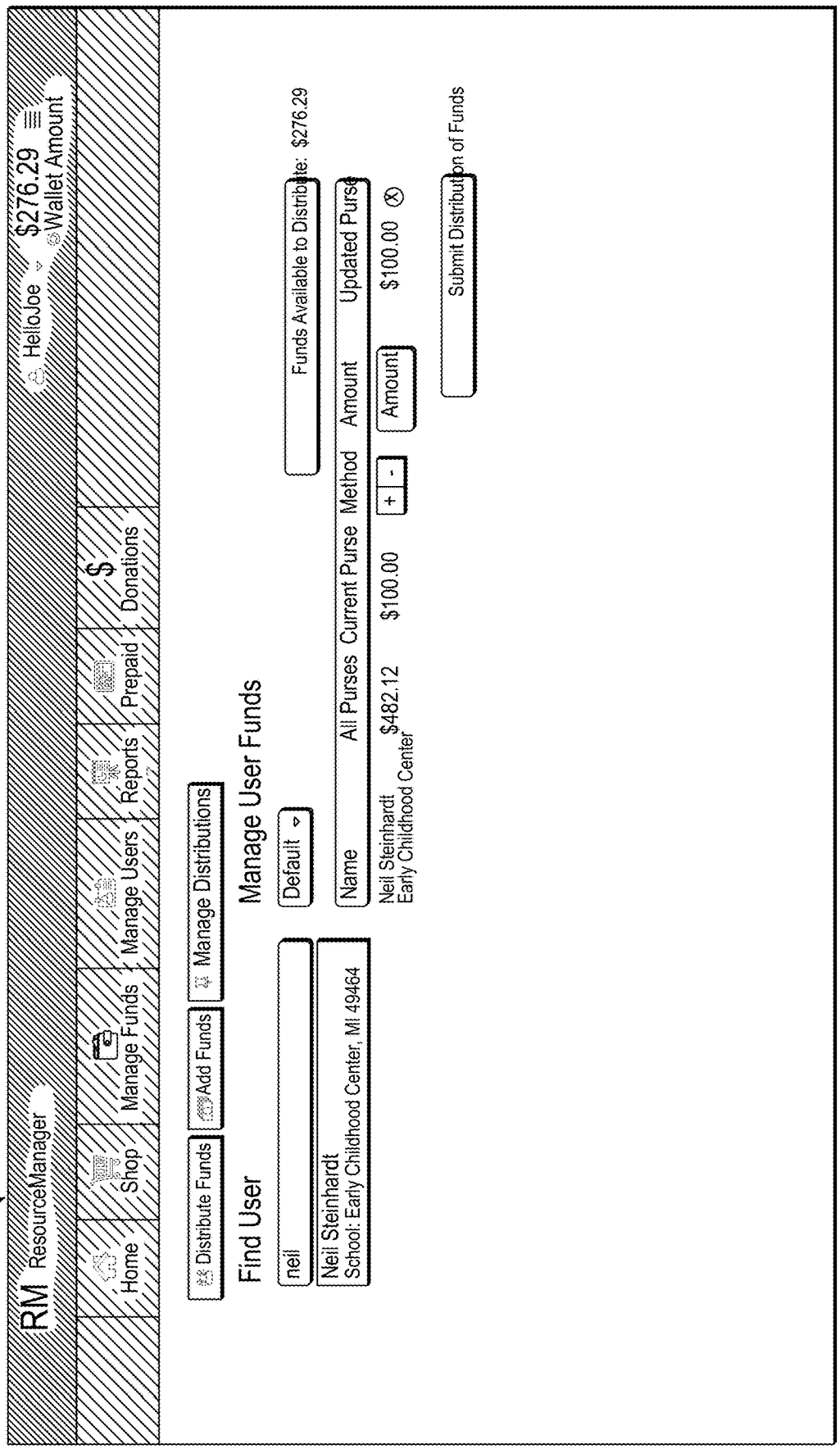
Figure 8H:
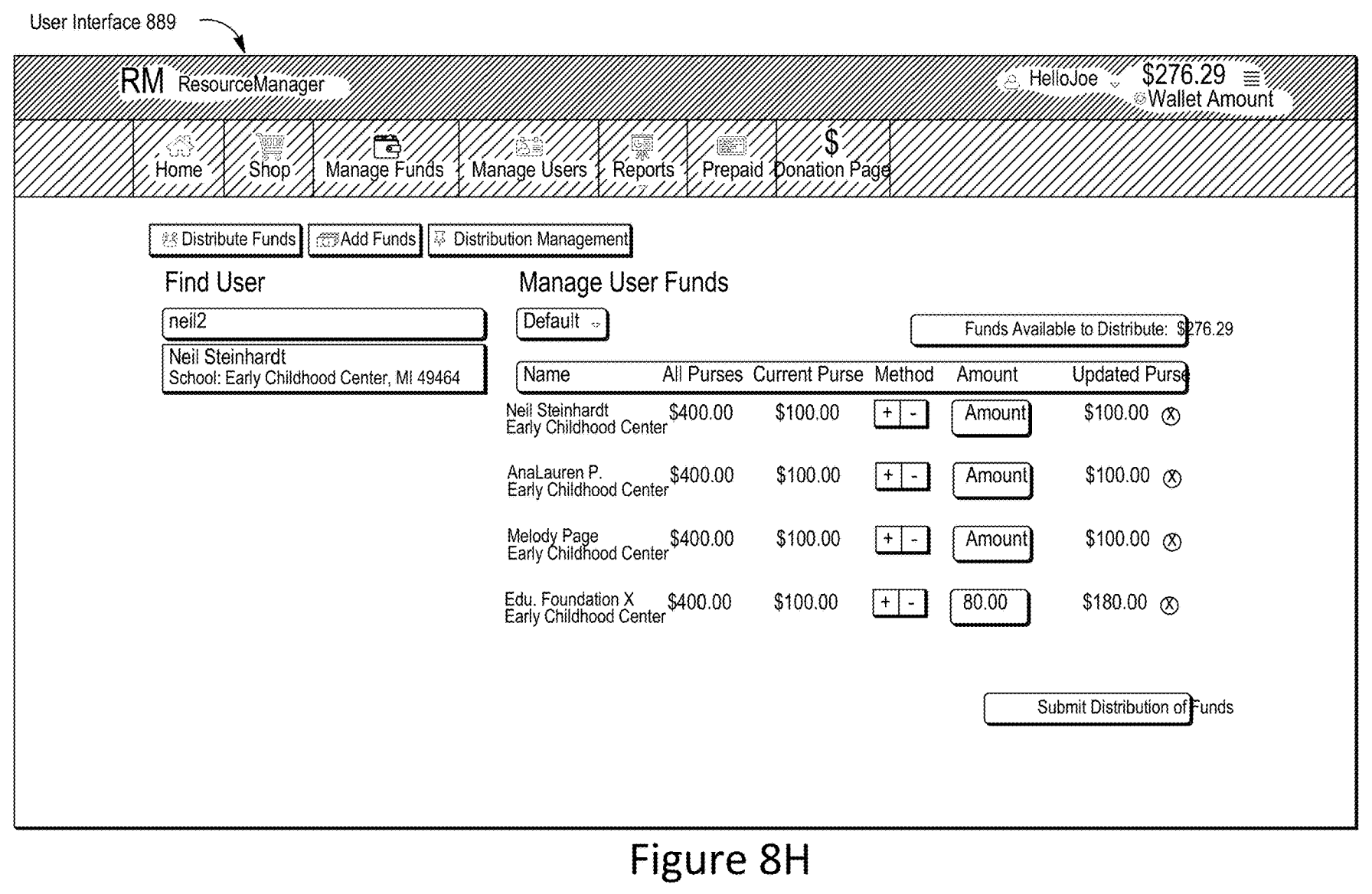

As is also shown in FIGS. 8G-8H, an authorized user for the example education foundation may search to quickly locate users whose resource distributions need to be adjusted (as shown in FIG. 8G, a search for "neil" reveals a single user associated with one purse and, as shown in FIG. 8H, a search for "neil2" reveals a single user associated with four different purses).

Figure 8I:
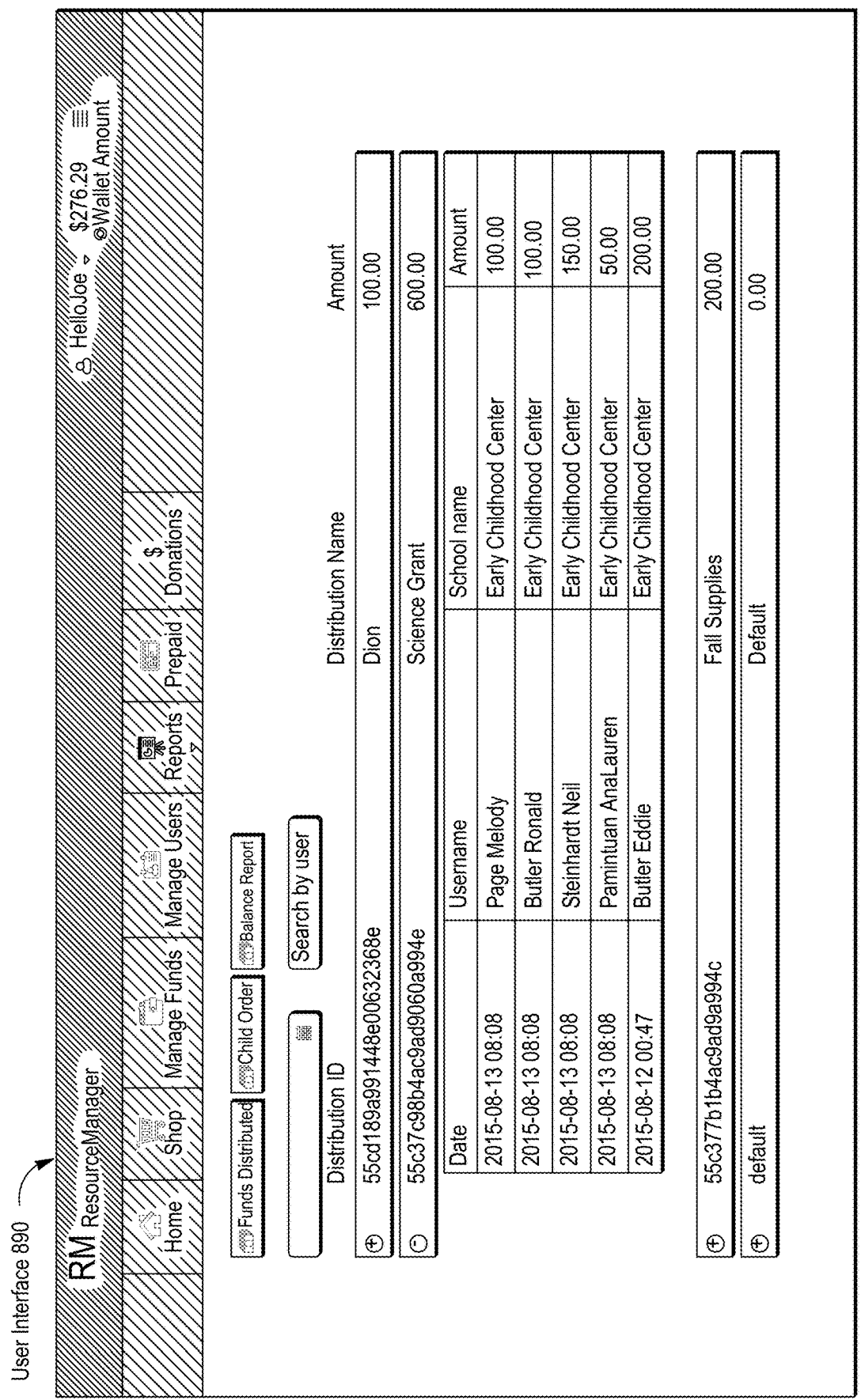

FIG. 8I also shows that authorized users (for any type of resource provider) are able to access information associated with individual distributions, in order to view individual transactions associated with those individual distributions.

Additional details regarding the user interfaces described with reference to FIG. 6 are provided below.

Figure 9:
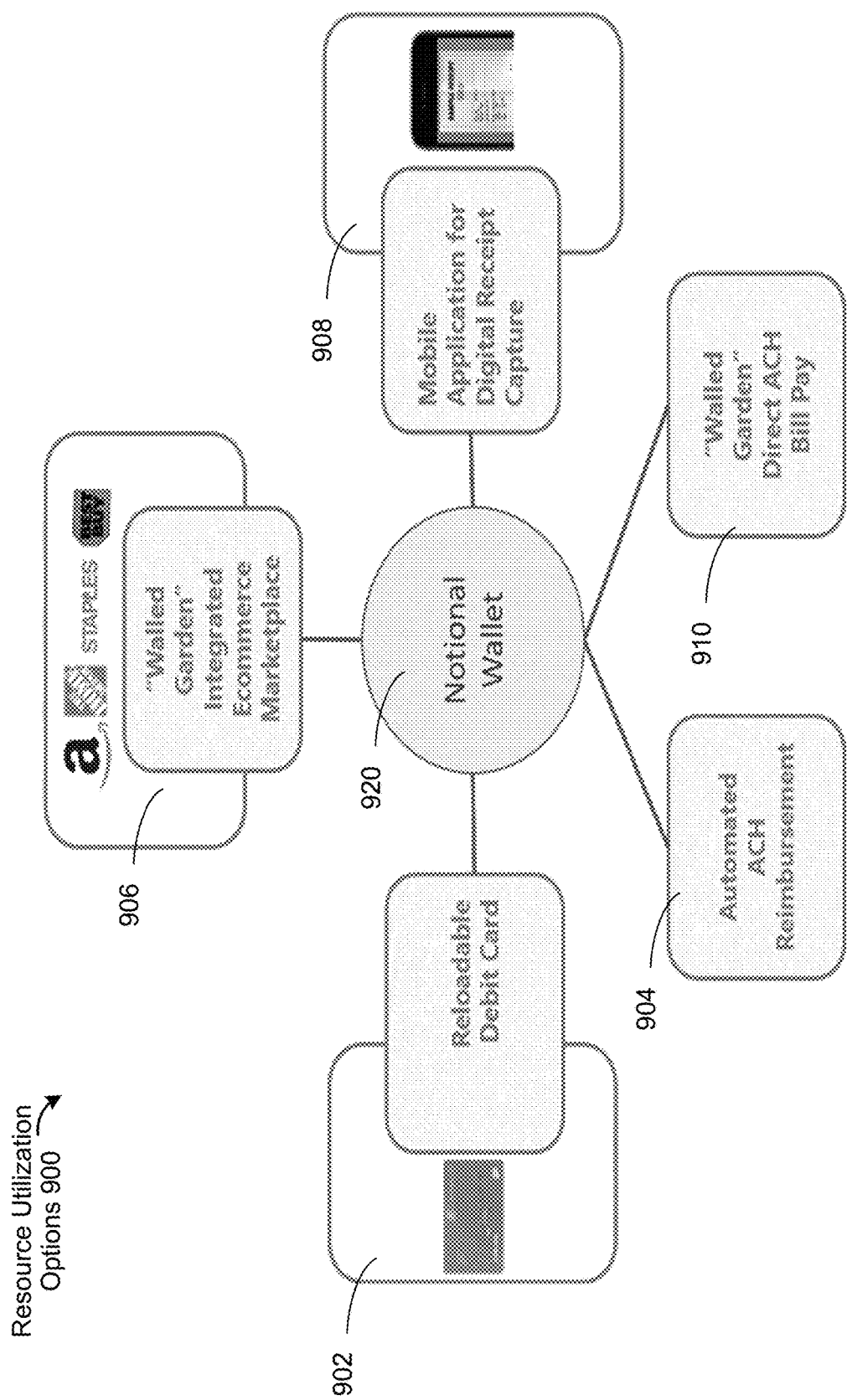
FIG. 9 is a block diagram illustrating resource utilization options, in accordance with some embodiments.

FIG. 9 is a block diagram illustrating resource utilization options 900, in accordance with some embodiments. As shown in FIG. 9, a user (e.g., a resource recipient, such as a teacher) of the resource management system 100 could choose to utilize or spend the resources in a digital wallet (which can be segmented into purses) in a variety of different ways, according to some embodiments. In some embodiments, a resource management server (e.g., server 106-1) provides the user with a notional wallet 920 that includes several options for resource utilization, including a reloadable debit card 902, an e-commerce marketplace 906, automated ACH reimbursements 904, and direct ACH bill pay 910. In some embodiments, the notional wallet 920 also includes a mobile application 908 for capturing digital receipts which the user could use to submit receipts for reimbursements and to associate with debit card charges. In some embodiments, a user links a personal bank account to the notional wallet 920, and submits receipts electronically (e.g., using a mobile or desktop application) or the mobile application 908. In some embodiments, the resource management server (e.g., using an automated ACH reimbursement module, such as module 904) processes the reimbursement in whole or in part, and the resource management application initiates a ACH to the user's bank account. In some embodiments, a user accesses or utilizes the resources by swiping a reloadable debit card 902. In some embodiments, the debit card holds no value initially and the balance remains in the digital wallet 920. When the user swipes the debit card, a signal (e.g., a transaction signal) is routed from a point of sale terminal to a processor in the resource management server. If there is usable resource left in the notional wallet 920, the resource management server funds the debit card 908 and settles the transaction. In some embodiments, resource recipients, such as a school district, send a selectable link (e.g., a web link embedded in an e-mail) to one or more vendors, and some of the vendors sign up (with the resource management server) using the selectable link and link their bank accounts. In some embodiments, the resource management server provides the user with a mechanism 910 to pay bills by providing the user with the list of vendors who have signed up for the online bill payment service (sometimes called DirectPay). In some embodiments, a user can obtain items from one or more vendors, from an integrated e-commerce marketplace 906, by spending or utilizing available resources in the notional wallet 920, and the resource management server manages both the dispensing of the resources and settling the transactions with the vendors.

FIG. 7A is a flowchart depicting a method 700 of providing tailored reports based on access rights in a resource management system, in accordance with some embodiments. FIGS. 8A-8I are used to illustrate the methods and/or processes of FIG. 7A. In some embodiments, each of the user interfaces presented in FIGS. 8A-8I are presented on a display of a computing device (e.g., display 208 of user computing device 102-1, as pictured for the user interfaces described above in FIG. 6). Although some of the examples which follow will be given with reference to inputs on a touch-sensitive display (e.g., of a mobile phone or a tablet device, in which a touch-sensitive surface and a display are combined), in some embodiments, the device detects inputs on a touch-sensitive surface that is separate from the display 208 (e.g., a desktop or a laptop computing device). In some embodiments, a server (e.g., resource management server 106-1, FIG. 3) receives information about inputs provided at a touch-sensitive display of an electronic device that is distinct from the server.

In some embodiments, the method 700 is performed by an electronic device (e.g., computing device 102-1, FIG. 2) and/or one or more components of the electronic device. In some embodiments, the method 700 is performed by a server (e.g., resource management server 106-1, FIG. 3) and/or one or more components of the server. In some embodiments, the electronic device and the server exchange information over a network (e.g., networks 104, FIG. 1) and each perform a portion of the method 700. In some embodiments, the method 700 is governed by instructions that are stored in a non-transitory computer-readable storage medium and that are executed by one or more processors of a device, such as the one or more processors 202 of device 102-1 (FIG. 2) and/or the one or more processors 302 of server 106-1 (FIG. 3). For ease of explanation, the following describes method 700 as performed by the server 106-1. In some embodiments, with reference to FIG. 2, the operations of method 700 are performed by or use, at least in part, a resource allocation web application (e.g., resource allocation web app 222), a resource management module (e.g., resource management module 226), a report generation module (e.g., report generation module 228), a user accounts database (e.g., one of user accounts databases 108), a reports database (e.g., one of reports databases 110), and/or a resource management database (e.g., one of resource management databases 112). Some operations in method 700 are, optionally, combined and/or the order of some operations is, optionally, changed.

As described below, the method 700 provides a fast, intuitive, easy-to-use, and robust way to generate tailored reports in a computer network (e.g., including a resource management system). The method automatically generates reports for a plurality of different resource providers based on detection of a single event (e.g., use of provisioned resources to obtain items for use at events associated with civic organizations or use of provisioned resource to obtain educational items for use in a classroom). In this way, the method reduces the time required for individual resource providers to monitor resource distributions and ensure that they are used properly.

Referring now to FIG. 7A, a resource allocation application (e.g., executing locally on a computing device 102 or executing through a client-server or web-based architecture by sending information between the computing device and a server 106) assigns (702) using the one or more processors, to at least two resource providers (e.g., (i) to a parent and to an educational foundation that each provided resources to a teacher or (ii) to a civic organization and to a parent or sister organization that is associated with the civic organization) that are each associated with a resource recipient (e.g., a teacher or a user), access rights to receive information about resource allocation events associated with the resource recipient. In some embodiments, assigning occurs in response to the at least two resource providers using the user interfaces shown in FIGS. 8G-8I to provide resources to the resource recipient. The resource allocation application detects (704) occurrence of a resource allocation event (e.g., use of at least a portion of the resources provided to the teacher/user) that is associated with the resource recipient (e.g., the teacher/user uses the user interfaces shown in FIGS. 8B-8E to select education items and to purchase them using the resources provided by the at least two resource providers).

In some embodiments, the server (or the resource allocation application executing thereon) receives, from a computing device distinct from the server (e.g., from a client device or from some other server with which the resource recipient interacts to obtain educational supplies using resources provided by the at least two distinct resource providers), information about the occurrence of the detected resource allocation event that is associated with the resource recipient (e.g., the information may include a purchase price, a date of purchase, an identifier of the service from which items were purchased, and other information that allows resource providers to monitor how resources are being expended by the resource recipient).

In response to detecting (and/or in resource to receiving the information about) the occurrence of the resource allocation event, the resource allocation application stores (706) information about the resource allocation event in a database that is in communication with the server (e.g., in a respective resource management database 112, FIG. 5A-5B). In some embodiments, in response to detecting (and/or in response to receiving the information about) the occurrence of the resource allocation event, the resource allocation application determines whether respective access rights assigned to the at least two distinct resource providers permit the at least two distinct resource providers to access information about the resource allocation event. For example, the respective access rights assigned to the at least two distinct resource providers may permit one of the at least two distinct resource providers access to more information (e.g., access to SKU-specific information, access to balance information for the resource recipient, purchase amounts, date of purchase, and information about where the purchase was made) than another of the resource providers is permitted to access (e.g., access to view a more limited set of information, such as a purchase amount, a date of purchase, and information about where the purchase was made (or a subset thereof), but not access to SKU-specific and overall balance information).

In accordance with a determination that respective access rights assigned to the at least two distinct resources providers permit the at least two distinct resources providers to access (at least some) information about the resource allocation event, the resource allocation application also generates (708) using the one or more processors a plurality of reports using the stored information in the database, the plurality of reports including at least two unique reports, one report for each of the at least two distinct resource providers based on respective assigned access rights associated with each of the at least two resource providers. In some embodiments, reports for users of a first type (e.g., schools, school districts, and educational foundations or civic organizations and non-profit groups (or administrators associated therewith)) are only available upon logging into the system 100, while reports for users of a second type are sent via email (e.g., parents or individual donors) automatically upon detection of the resource allocation event (and/or upon receiving of information about the resource allocation event).

In some embodiments, the resource allocation application also transmits each of the at least two distinct reports to the at least two distinct resource providers in accordance with report transmittal criteria associated with each of the at least two distinct resource providers.

In some embodiments, the report transmittal criteria include a criterion that is determined by the one or more processors to be satisfied when a first resource provider of the at least two distinct resource providers is of a first type, and transmitting a first report of the at least two distinct reports to the first resource provider includes transmitting the respective report in an email (i.e., an email that is automatically sent upon detection of or receipt or information about a resource allocation event).

In some embodiments, the report transmittal criteria include a criterion that is determined by the one or more processors to be satisfied when a second resource provider of the at least two distinct resource providers is of a second type, distinct from the first type, and transmitting a second report, including more information about the resource allocation event than the first report, of the at least two distinct reports to the second resource provider includes making the respective report available to the second resource provider via a secure website (i.e., the respective report is made available immediately, but the second resource provider logins into the secure website to view the respective report).

In some embodiments, the first type includes individual resource providers and the second type includes organizational resource providers.

In some embodiments, the resource allocation event corresponds to the resource recipient using (i) at least a portion of a first resource, provided by the first resource provider of the at least two distinct resource providers, and (ii) at least a portion of a second resource, provided by the second resource provider of the at least two distinct resource providers, to obtain educational supplies.

In some embodiments, the resource recipient is a teacher.

In some embodiments, the second resource provider is one of: (i) a school at which the teacher works, (ii) a school district that includes the school at which the teacher works, or an educational foundation that is associated with the teacher.

In some embodiments, the first resource provider is a parent of a student that is in one of the teacher's classes.

FIG. 7B is a flowchart depicting a method 740 of distributing and allocating resources in a resource management system, in accordance with some embodiments. FIGS. 8A-8I are used to illustrate the methods and/or processes of FIG. 7B. In some embodiments, each of the user interfaces presented in FIGS. 8A-8I are presented on a display of a computing device (e.g., display 208 of user computing device 102-1, as pictured for the user interfaces described above in FIG. 6). Although some of the examples which follow will be given with reference to inputs on a touch-sensitive display (e.g., of a mobile phone or a tablet device, in which a touch-sensitive surface and a display are combined), in some embodiments, the device detects inputs on a touch-sensitive surface that is separate from the display 208 (e.g., a desktop or a laptop computing device). In some embodiments, a server (e.g., resource management server 106-1, FIG. 3) receives information about inputs provided at a touch-sensitive display of an electronic device that is distinct from the server.

In some embodiments, the method 740 is performed by an electronic device (e.g., computing device 102-1, FIG. 2) and/or one or more components of the electronic device. In some embodiments, the method 740 is performed by a server (e.g., resource management server 106-1, FIG. 3) and/or one or more components of the server. In some embodiments, the electronic device and the server exchange information over a network (e.g., networks 104, FIG. 1) and each perform a portion of the method 740. In some embodiments, the method 740 is governed by instructions that are stored in a non-transitory computer-readable storage medium and that are executed by one or more processors of a device, such as the one or more processors 202 of device 102-1 (FIG. 2) and/or the one or more processors 302 of server 106-1 (FIG. 3). For ease of explanation, the following describes method 700 as performed by the server 106-1. In some embodiments, with reference to FIG. 2, the operations of method 740 are performed by or use, at least in part, a resource allocation web application (e.g., resource allocation web app 222), a resource management module (e.g., resource management module 226), a report generation module (e.g., report generation module 228), a user accounts database (e.g., one of user accounts databases 108), a reports database (e.g., one of reports databases 110), and/or a resource management database (e.g., one of resource management databases 112). Some operations in method 740 are, optionally, combined and/or the order of some operations is, optionally, changed.

As described below, the method 740 provides a fast, intuitive, easy-to-use, and robust way to manage the allocation and distribution of resources in a classroom resource management system.

Referring now to FIG. 7B, a resource allocation application (e.g., executing locally on a computing device 102 or executing through a client-server or web-based architecture by sending information between the computing device and a server 106) receives (742) through a first server (e.g., resource management server 106-1, FIG. 3) and from a first resource provider (e.g., a parent, an educational foundation, or a civic organization), a first provision of resources for a resource recipient and at least one restriction that restricts the resource recipient's use of the first provision of resources (e.g., an expiration date or a limited subset of SKUs for which the resources may be used). The resource allocation application segments (744) the first provision of resources, within a repository of resources associated with the resource recipient, such that the first provision of resources is uniquely identified as associated with the first resource provider (e.g., segments the first provision of resources as discussed above with respect to FIG. 6 and Table 1).

For example, as shown in FIG. 8D, the first provision of resources is shown as a separate purse within a checkout user interface 884, FIG. 8D. As shown in FIG. 8D, a "Step 1" section of the user interface 884 includes a representation of each purse associated with a current user (e.g., for the current user shown in FIG. 8D, a purse labeled "Default Purse" is shown, along with a current balance associated with that purse). An additional example is shown above (in conjunction with the descriptions of FIG. 6 provided above), in which a current user is associated with four different purses.

In some embodiments, the resource allocation application receives (746), from a second server (e.g., the second server is associated with an e-commerce retailer) distinct from the first server, information about available items (e.g., educational items, event-specific items, sports equipment, a list of SKUs, and information associated therewith) and receives (748), from the resource recipient, a request to use at least a portion of the first provision of resources to obtain one or more of the available items. In some embodiments, the request from the resource recipient is submitted by first navigating to a shop user interface 882, FIG. 8B, by selecting one of the "Shop" links shown on the overview user interface 880, FIG. 8A. In some embodiments, a user is then able to select an item displayed in the user interface shown in FIG. 8B and choose resources for purchasing the selected item (e.g., using the user interfaces 883 (reviewing order details), 884 (selecting funds to use to pay for ordered items), and 885 (reviewing ordered items and selected funds) shown in FIGS. 8C-8E, respectively).

In accordance with a determination that the request complies with the at least one restriction associated with the first provision of resources (e.g., complies with a SKU-based restriction or complies with an expiration date associated with the first provision of resources), the resource allocation application processes (750) the request and generates a report for the resource provider (e.g., a report that is either emailed if the user is of a first type (e.g., a parent or individual donor) or made available for later access if the user is of a second type (e.g., an educational foundation or a civic organization (or an administrator associated therewith)).

In some embodiments, the at least one restriction is an expiration date, a vendor-specific restriction, or a SKU-specific restriction. In this way, resources providers are able to control how provided resources will be used by the resource recipient, even though the resource recipient may use provided resources at a number of different services (including physical, brick-and-mortar stores and digital, online stores, or both).

In some embodiments, the resource recipient is a teacher and the first resource provider is an educational foundation associated with the teacher.

In some embodiments, the resource recipient is a teacher and the first resource provider is a parent of a student that is in one of the teacher's classes.

In some embodiments, generating the report for the resource provider includes generating a report for a school that is associated with the resource recipient. In some embodiments, generating the report for the resource provider includes generating a report for a school district that includes the school that is associated with the resource recipient. Generating of reports is discussed in more detail above in reference to method 700 (for brevity those details are not repeated here).

In some embodiments, the first server is a resource management server provided by a first entity, and the second server is an educational supplies server provided by a second entity distinct from the first entity. For example, the resource management server is provided by CLASSWALLET and the second server is provided by an online retailer, such as AMAZON, with the second server communicating with the first server (and vice versa) in order to ensure that resources are used in accordance with any applicable access restrictions.

In some embodiments, resources providers are able to access the resource allocation application to monitor and manage resource distributions. As shown in FIGS. 8G and 8H, a respective resource provider may access user interface 887, FIG. 8G, to search for a particular user (i.e., "neil" or "neil2") and to then manage user funds (i.e., funds allocated to purses associated with that user). For example, as shown in FIG. 8G, the respective resource provider is able to quickly view an amount that is available for disbursement (e.g., "$276.29" in the example of FIG. 8G") check current balances available for individual purses and is also able to easily and quickly edit disbursements to those individual purses by selecting a "+" or "−" affordance while viewing a particular individual purse (e.g., while viewing the "Default" purse details shown in FIG. 8G, selection of the "+" affordance causes distribution of additional funds to the "Default" purse and selection of the "−" affordance causes withdrawal of previously provided funds from the "Default" purse). In some embodiments, after selecting the "+" and "−" buttons, selection of the "Submit Distribution of Funds" button causes the distributions or withdrawals to be processed.

In some embodiments, selection of the "x" affordance shown in a row with individual purses causes deletion of an individual purse and withdrawal of any remaining funds.

In some embodiments, the resource allocation application also includes a user interface 890, providing an overview of all resource allocation events associated with particular distribution IDs (FIG. 8I). As shown in FIG. 8I, a resource provider is able to access the user interface 890 to view each individual resource allocation event (e.g., a listing of dates, usernames, school names, and amounts for each resource allocation event associated with a particular distribution ID). In this way, resource providers have access to an overview and may easily monitor (and alter) resource distributions.

It should be understood that the particular order in which the operations in FIGS. 7A-7B have been described is merely exemplary and is not intended to indicate that the described order is the only order in which the operations could be performed. One of ordinary skill in the art would recognize various ways to reorder and/or combine the operations described herein.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will also be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of managing resource distributions in a computer network, comprising:

receiving, from a first server, information about a first resource provider that has provided resources to each of a plurality of resource recipients, wherein the information includes resource distribution data indicating respective provisions of resources to each of the plurality of resource recipients and respective restrictions that segment use of the respective provisions of resources such that the respective provisions of resources are separated from distinct resources provided by a second resource provider;

in response to receiving the information, displaying on a display in a graphical user interface:
(i) a first user interface region that allows the first resource provider to search for each of the plurality of resource recipients, and
(ii) a second user interface region, including a first set of respective affordances associated with a first resource recipient, the first set of the respective affordances allowing the first resource provider to manage provisions of resources to the first resource recipient, and a second set of the respective affordances associated with a second resource recipient, the second set of the respective affordances allowing the first resource provider to manage provisions of resources to the second resource recipient;

in response to receiving a request via the first user interface region to search for a first resource recipient, updating the second user interface region of the graphical user interface to cease displaying the second set of the respective affordances, such that only the first set of respective affordances is displayed within the second user interface region, including indicating in the second user interface region that the first resource recipient is uniquely identified as associated with a respective provision of resources;

in response to receiving a selection, from within the second user interface region, of one of the affordances from the first set of the respective affordances associated with the first resource recipient:
transmitting, to the first server, one or more updates to a provision of resources for the first resource recipient;
receiving a confirmation from the first server for the one or more updates; and
in response to receiving the confirmation, updating the second user interface region of the graphical user interface to reflect the one or more updates; and after the first resource recipient uses a portion of the provision of resources to obtain one or more available items from a second server that is distinct from the first server and also uses the distinct resources to obtain one or more other items, providing the first resource provider with access to a report showing details of the first resource recipient's use of the portion of the provision of resources to obtain the one or more available items, without showing details of the first resource recipient's use of the distinct resources to obtain the one or more other items.

2. The method of claim 1, wherein the respective restrictions are an expiration date, a vendor-specific restriction, or a SKU-specific restriction.

3. The method of claim 1, wherein the first resource recipient is a teacher and the first resource provider is an educational foundation associated with the teacher.

4. The method of claim 1, wherein the first resource recipient is a teacher and the first resource provider is a parent of a student that is in one of the teacher's classes.

5. The method of claim 1, wherein the report includes a report for a school that is associated with the resource recipient.

6. The method of claim 5, wherein the report includes a report for a school district that includes the school that is associated with the resource recipient.

7. The method of claim 1, wherein the first server is a resource management server provided by a first entity, and further wherein the second server is an educational supplies server provided by a second entity distinct from the first entity.

8. The method of claim 1, further comprising providing resource distribution data for display in a graphical user interface used by the first resource provider to monitor and manage resource distribution via the graphical user interface.

9. A non-transitory computer-readable storage medium storing executable instructions that, when executed by a first electronic device with one or more processor and memory, cause the first electronic device to:
receive, from a first server, information about a first resource provider that has provided resources to each of a plurality of resource recipients, wherein the information includes resource distribution data indicating respective provisions of resources to each of the plurality of resource recipients and respective restrictions that segment use of the respective provisions of resources such that the respective provisions of resources are separated from distinct resources provided by a second resource provider;

in response to receiving the information, display on a display in a graphical user interface:
(i) a first user interface region that allows the first resource provider to search for each of the plurality of resource recipients, and
(ii) a second user interface region, including a first set of respective affordances associated with a first resource recipient, the first set of the respective affordances allowing the first resource provider to manage provisions of resources to the first resource recipient, and a second set of the respective affordances associated with a second resource recipient, the second set of the respective affordances allowing the first resource provider to manage provisions of resources to the second resource recipient;

in response to receiving a request via the first user interface region to search for a first resource recipient, update the second user interface region of the graphical user interface to cease displaying the second set of the respective affordances, such that only the first set of respective affordances is displayed within the second user interface region, including indicating in the second user interface region that the first resource recipient is uniquely identified as associated with a respective provision of resources;

in response to receiving a selection, from within the second user interface region, of one of the affordances from the first set of the respective affordances associated with the first resource recipient:
transmit, to the first server, one or more updates to a provision of resources for the first resource recipient;
receive a confirmation from the first server for the one or more updates; and
in response to receiving the confirmation, update the second user interface region of the graphical user interface to reflect the one or more updates; and after the first resource recipient uses a portion of the provision of resources to obtain one or more available items from a second server that is distinct from the first server and also uses the distinct resources to obtain one or more other items, provide the first resource provider with access to a report showing details of the first resource recipient's use of the portion of the provision of resources to obtain the one or more available items, without showing details of the first resource recipient's use of the distinct resources to obtain the one or more other items.

10. The non-transitory computer-readable storage medium of claim 9, wherein the respective restrictions are an expiration date, a vendor-specific restriction, or a SKU-specific restriction.

11. The non-transitory computer-readable storage medium of claim 9, wherein the first resource recipient is a teacher and the first resource provider is an educational foundation associated with the teacher.

12. The non-transitory computer-readable storage medium of claim 9, wherein the first resource recipient is a teacher and the first resource provider is a parent of a student that is in one of the teacher's classes.

13. The non-transitory computer-readable storage medium of claim 9, wherein the first server is a resource management server provided by a first entity, and further wherein the second server is an educational supplies server provided by a second entity distinct from the first entity.

14. The non-transitory computer-readable storage medium of claim 9, wherein the executable instructions further cause the first electronic device to provide resource distribution data for display in a graphical user interface used by the first resource provider to monitor and manage resource distribution via the graphical user interface.

15. A server system for managing resource distributions in a computer network, comprising:
 one or more processors; and
 memory storing executable instructions that, when executed by the one or more processors of the server system, cause the server system to:
  receive, from a first server, information about a first resource provider that has provided resources to each of a plurality of resource recipients, wherein the information includes resource distribution data indicating respective provisions of resources to each of the plurality of resource recipients and respective restrictions that segment use of the respective provisions of resources such that the respective provisions of resources are separated from distinct resources provided by a second resource provider;
  in response to receiving the information, display on a display in a graphical user interface:
   (i) a first user interface region that allows the first resource provider to search for each of the plurality of resource recipients, and
   (ii) a second user interface region, including a first set of respective affordances associated with a first resource recipient, the first set of the respective affordances allowing the first resource provider to manage provisions of resources to the first resource recipient, and a second set of the respective affordances associated with a second resource recipient, the second set of the respective affordances allowing the first resource provider to manage provisions of resources to the second resource recipient;
  in response to receiving a request via the first user interface region to search for a first resource recipient, update the second user interface region of the graphical user interface to cease displaying the second set of the respective affordances, such that only the first set of respective affordances is displayed within the second user interface region, including indicating in the second user interface region that the first resource recipient is uniquely identified as associated with a respective provision of resources;
  in response to receiving a selection, from within the second user interface region, of one of the affordances from the first set of the respective affordances associated with the first resource recipient:
   transmit, to the first server, one or more updates to a provision of resources for the first resource recipient;
   receive a confirmation from the first server for the one or more updates; and
   in response to receiving the confirmation, update the second user interface region of the graphical user interface to reflect the one or more updates; and
  after the first resource recipient uses a portion of the provision of resources to obtain one or more available items from a second server that is distinct from the first server and also uses the distinct resources to obtain one or more other items, provide the first resource provider with access to a report showing details of the first resource recipient's use of the portion of the provision of resources to obtain the one or more available items, without showing details of the first resource recipient's use of the distinct resources to obtain the one or more other items.

16. The server system of claim 15, wherein the respective restrictions are an expiration date, a vendor-specific restriction, or a SKU-specific restriction.

17. The server system of claim 15, wherein the first resource recipient is a teacher and the first resource provider is either an educational foundation associated with the teacher or a parent of a student that is in one of the teacher's classes.

18. The server system of claim 15, wherein the report includes either a report for a school that is associated with the first resource recipient, or a report for a school district that includes the school that is associated with the first resource recipient.

19. The server system of claim 15, wherein the first server is a resource management server provided by a first entity, and further wherein the second server is an educational supplies server provided by a second entity distinct from the first entity.

20. The server system of claim 15, wherein the memory stores further executable instructions that, when executed by the one or more processors of the server system to provide resource distribution data for display in a graphical user interface used by the first resource provider to monitor and manage resource distribution via the graphical user interface.

* * * * *